(12) United States Patent
Ali

(10) Patent No.: US 12,423,548 B2
(45) Date of Patent: Sep. 23, 2025

(54) CHIP CARD WITH RADIO-FREQUENCY ANTENNAS

(71) Applicant: IDEMIA FRANCE, Courbevoie (FR)

(72) Inventor: Ahmed Ali, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 18/663,253

(22) Filed: May 14, 2024

(65) Prior Publication Data
US 2024/0386232 A1 Nov. 21, 2024

(30) Foreign Application Priority Data
May 15, 2023 (FR) ...................................... 2304806

(51) Int. Cl.
*G06K 19/077* (2006.01)
*H01Q 1/22* (2006.01)
*H01Q 1/38* (2006.01)
*H01Q 1/50* (2006.01)

(52) U.S. Cl.
CPC . *G06K 19/07722* (2013.01); *G06K 19/07749* (2013.01); *H01Q 1/2283* (2013.01); *H01Q 1/38* (2013.01); *H01Q 1/50* (2013.01)

(58) Field of Classification Search
CPC ....... G06K 17/07722; G06K 19/07749; H01Q 1/2283; H01Q 1/38; H01Q 1/50
USPC ...................................................... 235/492
See application file for complete search history.

(56) References Cited

U.S. PATENT DOCUMENTS

| 2009/0085133 A1* | 4/2009 | Doan ................... H01Q 1/2225 438/59 |
| 2010/0072287 A1* | 3/2010 | Kai .......................... H01Q 7/00 343/741 |
| 2012/0074233 A1* | 3/2012 | Finn .................. G06K 19/07756 235/492 |
| 2013/0002497 A1* | 1/2013 | Hamabe .................... H01Q 9/26 343/730 |
| 2015/0269474 A1* | 9/2015 | Finn ....................... B23K 26/40 216/13 |
| 2020/0257953 A1 | 8/2020 | Lotya et al. |
| 2021/0049431 A1 | 2/2021 | Finn |
| 2022/0237423 A1 | 7/2022 | Lotya |

FOREIGN PATENT DOCUMENTS

WO    WO 2023/002331 A1    1/2023

OTHER PUBLICATIONS

Preliminary French Search Report & Written Opinion issued Jan. 19, 2024 in French Application 2304806 filed on May 15, 2023, 10 pages.

* cited by examiner

*Primary Examiner* — Michael G Lee
*Assistant Examiner* — David Tardif
(74) *Attorney, Agent, or Firm* — Oblon, McClelland, Maier &Neustadt, L.L.P.

(57) ABSTRACT

A chip card having a card body having a metal layer that is at least partially covered by a coating that is more conductive than the metal layer, an RF chip, and a first RF antenna that is placed in a cut-out zone and connected to the chip. The metal layer includes at least one RF antenna portion that is electrically insulated from the metal layer and from the first RF antenna and that is configured to collect an image current induced by first eddy currents flowing at least over the coating of the metal layer and to allow coupling to the first antenna.

20 Claims, 16 Drawing Sheets

CHIP CARD WITH RADIO-FREQUENCY ANTENNAS

TECHNICAL FIELD

The invention relates to the field of chip cards and more particularly relates to metal chip cards able to operate in contactless mode.

PRIOR ART

At the present time, use of chip cards (or smart cards) is commonplace in everyday life. Such cards are for example used as bank cards, loyalty cards, access cards, etc., and may take various formats depending on their respective uses. Chip cards may be designed to perform various types of functions, and in particular to carry out transactions, such as banking transactions (payments, transfers, etc.), authentication-related transactions, etc.

As known, a chip card generally comprises a card body that is equipped with an electronic chip that is configured to exchange signals with the outside world and to perform various functions depending on the desired use of the card. To this end, chip cards are equipped with means of communication allowing interaction with the outside world, and typically with an NFC reader or external reader.

Conventionally, a chip card is designed to interact with an external NFC reader by means of external contacts accessible on the surface of the card. Contact pins of an external NFC reader may thus be positioned on the external contacts of the card, in order to allow a communication by contact.

More recently, contactless chip cards have seen increasing growth due to the greater speed and simplicity of contactless transactions. To this end, contactless cards incorporate a radio-frequency (RF) antenna allowing RF signals to be exchanged with an external NFC reader (NFC standing for Near Field Communication). This RF antenna is generally composed of a plurality of conductive turns that lie in the body of the card.

The structure and appearance of chip cards may vary depending on the case. In particular, metal chip cards are seeing increasing interest notably because of the attractive aesthetic appearance of these cards (metallic reflections, brushed surface effect, etc.), the impression of quality that they may give (the appreciable weight of the metal, high-class aesthetics), or the connotation of prestige associated therewith by their users. Due in particular to their considerable weight and the impression of high quality that they give, these cards are preferred by certain users as they may serve as a social marker and differentiating element. This type of metal card is described in the documents US2021049431 and WO2023002331.

However, it has been observed that the presence of metal in the body of a chip card causes major difficulties when the card incorporates an RF antenna so as to be able to operate in contactless mode. The metal acts as an electromagnetic shield and blocks or obstructs the RF signals exchanged by the RF antenna with the outside world. The metal present in the card body may thus impede contactless communication between a chip card and an external NFC reader, and for example hinder a contactless transaction (a payment inter alia).

There is therefore a need for a high-performance metal (RFID for example) chip card that is simple to manufacture, and that is capable of effective contactless interaction with an external NFC reader, whatever the position of the card with respect to an external NFC reader, under defined operating conditions.

SUMMARY OF THE INVENTION

To this end, the present invention relates to a chip card comprising:
a card body formed at least partly by a metal layer comprising a cut-out zone;
an RF chip;
a first RF antenna that is placed in or facing the cut-out zone and electrically connected to the RF chip;
at least one RF antenna portion that is electrically insulated from the metal layer and from the first RF antenna, said at least one antenna portion being a second RF antenna comprising:
(i) a first antenna portion lying facing a portion of the metal layer; and
(ii) a second antenna portion, electrically connected to the first antenna portion, and lying facing the cut-out zone so as to allow magnetic coupling to the first antenna, characterized in that the metal layer is at least partially covered by a coating that is more conductive than the metal layer and in that
said first antenna portion lies facing one portion of the metal layer covered by said coating so as to collect said image current induced by first eddy currents flowing at least over the coating of the metal layer and to allow the second antenna portion to be coupled to the first RF antenna.

Said at least one RF antenna portion is thus arranged to collect an image current induced by first eddy currents flowing over the coating of the metal layer.

Those skilled in the art will understand that, since the conductive coating is never perfect, said at least one antenna portion also collects the image current induced by eddy currents flowing in the thickness of this coating, or even through the metal layer itself if the thickness of the coating is less than its skin depth.

In one embodiment, the thickness of the coating is greater than the skin depth, at the frequency of use, of said coating.

Skin depth 'δ' is given approximately by the formula:

$$\delta \cong \frac{1}{\sqrt{\pi f \mu \sigma}}$$

'f' being the frequency of the signal in Hz, 'µ' the permeability of said coating, 'σ' the electrical conductivity of the coating in S/m and δ being in metres.

In one embodiment, the metal layer is entirely covered by said coating. This embodiment is the simplest to implement, but those skilled in the art will understand that it is not absolutely essential for the metal layer to be entirely covered, the conductive coating needing at least to be present in the zones of the card corresponding to the zones of flow of the dominant eddy currents.

Consequently, said at least one antenna portion can also collect an image current induced by eddy currents flowing over portions of the metal layer that are not covered by the coating.

In one embodiment, the conductivity of said coating is greater than $3.5 \times 10^7$ S/m.

In one embodiment, the coating is made of copper, silver or gold.

In one embodiment, the eddy currents are produced under the effect of a magnetic field to which the chip card is subjected.

In one embodiment, said at least one RF antenna portion is electrically insulated from the metal layer and from the first RF antenna by an insulating layer placed in between said at least one RF antenna portion on the one hand, and the metal layer and cut-out zone on the other hand.

According to one embodiment, the chip card further comprises an electronic module comprising the RF chip, said electronic module being arranged in or facing the cut-out zone.

According to one embodiment, the magnetic coupling allows the RF chip to set up a contactless communication with the world outside the chip card using said at least one RF antenna portion coupled to the first RF antenna.

According to one embodiment, the first and second antenna portions of the second RF antenna are connected in parallel with a capacitive component.

According to one embodiment, the first RF antenna is placed facing the cut-out zone so that the cut-out zone lies in between the first and second RF antennas, so as to allow said magnetic coupling between said first and second antennas.

In a first variant, the cut-out zone opens onto a peripheral edge of the metal layer.

This first variant of the invention thus provides a high-performance metal (RFID for example) chip card that is simple to manufacture, and that is capable of effective contactless interaction with an external terminal, whatever the orientation of the card with respect to the external terminal.

When the chip card is subjected to a magnetic field, the combined action of the image current collected by the first antenna portion on the one hand, and of a current induced in the second antenna portion by the magnetic field in the cut-out zone on the other hand, allows the amount of energy collected in the second RF antenna from the magnetic field to be maximized, and therefore effective magnetic coupling between the two RF antennas to be guaranteed, this allowing maximum energy to be delivered to the RF chip connected to the first RF antenna.

In operation, under the effect of the magnetic field to which the chip card is subjected, the RF chip is thus capable of using the second RF antenna coupled to the first RF antenna to communicate with an external terminal (and in particular to transmit RF signals to and/or receive RF signals from the terminal). When a user presents the chip card to the terminal, a contactless communication may thus be set up between the terminal and the chip card, whatever the orientation of the latter with respect to the terminal. Specifically, eddy currents are generated on the coating of the metal layer whatever the orientation of the chip card relative to the terminal. Likewise, whatever face of the chip card is presented in front of the terminal, the second antenna portion of the second antenna is capable of collecting a current component induced by the magnetic field in the cut-out zone.

In one embodiment, the second RF antenna is configured so that the first antenna portion lies facing a peripheral zone of the metal layer covered by the coating.

In one embodiment, the metal layer comprises a slit connecting the cut-out zone to the peripheral edge of the metal layer (corresponds to claim 4 of the first specification). According to one embodiment, the cut-out zone extends to the peripheral edge of the metal layer.

According to one embodiment, the second RF antenna is configured so that the second antenna portion lies exclusively facing the cut-out zone.

The inventors have observed that prior-art metal chip cards in particular encounter a problem when the card is moved towards the NFC reader flat but away from its centre. This is very common in the RFID HF NFC environment, for example during a payment when the user moves her or his card towards the reader of the point of sale in an off-centred manner. FIG. 23 for example illustrates an operational volume in the entirety of which the card must be operational in order to meet a standard defined by the international organization EMVCo. Those skilled in the art may refer to the document "EMV Contactless Specifications for Payment Systems, Book D: EMV Contactless Communication Protocol Specification. Version 2.6, March 2016.". One of the objectives of EMVCo is to guarantee the interoperability and compatibility of chip cards and chip-card readers under defined operating conditions.

This operational volume is defined by dimensions S1, S2, D1, D2 that are recalled in FIG. 23.

This figure also shows the projection of 9 points of the volume onto a plane. For example, point 6 illustrates a situation in which the centre of the card is offset by 25 mm with respect to the centre of the NFC reader.

As things stand, metal chip cards do not function satisfactorily in the entirety of the EMVCo operational volume, in particular in card positions corresponding to point 6.

To further improve the operation of the chip card according to the invention, in a second variant of the invention, said metal layer consists of a first region and second region that are entirely delineated by a straight line parallel to a short side of the card, the first region entirely containing the cut-out zone and its area being smaller than the area of the second region,
- a first slit connecting the cut-out zone to a peripheral edge of the first region;
- a second slit opening either onto a peripheral edge of the metal layer or into the cut-out zone, the second slit ending with a closed portion in the second region; and
- said at least one antenna portion being a second antenna comprising at least one turn facing the first slit and at least one turn located facing the second slit.

The invention thus provides a high-performance metal (RFID for example) chip card that is simple to manufacture, and that is capable of effective contactless interaction with an external NFC reader, whatever the position and orientation of the card with respect to an external NFC reader.

Very advantageously, the metal layer therefore comprises at least two slits, a first slit being located in the first region, the second slit being located in the second region.

Preferably, the first slit opens onto a short side of the chip card, closest to the cut-out zone.

Preferably, the second metal slit opens into the cavity and ends in a zone of the card located between the cavity and the centre of the chip card.

Each of these slits allows the magnetic field generated by a card reader to pass through the metal layer, and a current to thus be induced in the turns of the second antenna located facing these slits.

This configuration also allows each of the aforementioned turns of the second antenna to collect, locally in the slits, an image current induced by a current flowing over the metal layer because of the magnetic flux generated by the chip-card reader.

When the metal layer is not entirely covered by a coating, the coating must at least be present in the zones of flow of the dominant currents, and in particular along the peripheral edges of the card and along the two slits.

As detailed below, because of the continuity of the eddy currents, the two currents collected by these antenna turns, namely the one induced directly by the electromagnetic field passing through a slit and the one that is an image of a local eddy current flowing through the metal layer, add constructively.

This configuration allows effective coupling between the two antennas, whatever the operating conditions of the card.

In one embodiment of this second variant, the second RF antenna comprises:
- a first antenna portion lying facing a peripheral zone of the metal layer covered by said coating, at least one turn of said first antenna portion lying facing the first slit,
- a second antenna portion connected to the first antenna portion and arranged at least partially facing one portion of the second region of the metal layer covered by said coating, at least one turn of said second antenna portion lying facing the second slit,
- a third antenna portion, electrically connected to the second antenna portion, and lying facing the cut-out zone so as to allow coupling to the first antenna;
  (i) the first antenna portion being configured to collect an image current induced by first eddy currents flowing on an edge through the metal layer when the chip card is subjected to an electromagnetic field under operating conditions of the chip card;
  (ii) the second antenna portion being configured to collect an image current induced by eddy currents flowing through the second region of the metal layer when the chip card is subjected to an electromagnetic field under what are called adverse operating conditions corresponding to only some of said operating conditions.

In particular, operating conditions may be adverse when the cut-out zone (or cavity) is relatively far from the maximum-strength field.

The first antenna portion is arranged facing a peripheral zone of the metal layer covered by said coating, and is preferably routed substantially rectangularly so as to follow the outline of the chip card along its four sides, particularly in the first region of the card in the vicinity of the cut-out zone.

Normally, whatever the operating conditions of the card, the magnetic field of the card reader generates a loop of an eddy current that flows along the edge of the card and that induces an image current that is able to be collected by the first portion of the second antenna.

The first portion of the second antenna advantageously makes it possible to harvest the energy of a main loop of the eddy currents flowing along the peripheral edge of the metal layer when the entire surface of the card is exposed to a uniform magnetic field generated by the antenna of a reader of said card, and in particular when the latter is centred with respect to the antenna of the chip-card reader.

The second portion of the second antenna for its part makes it possible to efficiently harvest the energy of the eddy currents flowing through the coating of the chip card when the chip card is used under less favourable conditions, the card being off-centre with respect to the antenna of the card reader.

Specifically, when the card is off-centre with respect to the antenna of the reader so that the cut-out zone and the first antenna are offset from the centre of the antenna of the reader, the main loop of the eddy current is mainly confined to the second region of the metal layer, then facing the maximum-strength magnetic field.

In one embodiment, the second region comprises a special zone for exploitation of eddy currents, this special zone being entirely covered by said coating, the portion of the turn of the second antenna being located facing the second slit in this special zone.

In one embodiment, the special zone for exploitation of eddy currents is a disk centred on said card and the radius of which corresponds to the radius of an operational volume of said card.

This embodiment makes it possible to guarantee that, whatever the operating conditions of the chip card, the second slit of the metal layer will be located in this operational zone and that a main loop of the eddy current will flow around the edge of this slit.

In one embodiment, the chip card complies with the EMVCo standard, the zone for exploitation of eddy currents being a disk of 25 mm radius centred on said card.

When the chip card is subjected to a magnetic field, the combined action of the image current obtained from the first portion and/or second portion of the second antenna on the one hand, and of a current induced in the second portion and/or third portion of the second antenna by the magnetic field received through the metal layer on the other hand, allows the amount of energy collected in the second RF antenna from the magnetic field to be maximized, and therefore effective magnetic coupling between the two RF antennas to be guaranteed, this allowing maximum energy to be delivered to the RF chip connected to the first RF antenna.

In operation, under the effect of the magnetic field to which the chip card is subjected, the RF chip is thus capable of using the second RF antenna coupled to the first RF antenna to communicate with an external NFC reader (and in particular to transmit RF signals to and/or receive RF signals from the NFC reader). When a user presents the chip card to the NFC reader, under determined operating conditions, a contactless communication may thus be set up between the NFC reader and the chip card, whatever the orientation of the latter with respect to the NFC reader. Specifically, eddy currents are generated in the metal layer whatever the orientation of the chip card relative to the NFC reader. Likewise, whatever face of the chip card is presented in front of the NFC reader, the third antenna portion of the second antenna is capable of collecting a current component induced by the magnetic field in the cut-out zone.

According to one particular embodiment, the second RF antenna is configured so that the third antenna portion lies exclusively facing the cut-out zone.

According to one particular embodiment, the first and third antenna portions of the second RF antenna are connected in parallel with a capacitive component.

The invention also relates to a process for manufacturing a chip card from a card body formed at least partly by a metal layer comprising a cut-out zone, the process comprising:
- covering at least partially, and preferably entirely, the metal layer with a coating that is more conductive than the metal layer;
- forming, on or in the card body, a first RF antenna in or facing the cut-out zone of the metal layer;
- assembling an RF chip with the card body so that the RF chip is electrically connected to the first RF antenna; and
- forming, on or in the card body, at least one RF antenna portion that is electrically insulated from the metal layer and from the first RF antenna and that is configured to collect an image current induced by first eddy currents flowing at least over the coating of the metal layer and to allow coupling to the first antenna.

In one embodiment, the cut-out zone opens onto a peripheral edge of the metal layer, said at least one antenna portion being a second RF antenna comprising:
  (i) a first antenna portion lying facing the metal layer with a view to collecting an image current induced by first eddy currents flowing at least over the coating of the metal layer; and
  (ii) a second antenna portion, electrically connected to the first antenna portion and lying facing the cut-out zone so as to allow magnetic coupling between the first RF antenna and the second RF antenna.

In another embodiment of the manufacturing process, the body of the card is of generally rectangular shape, the metal layer consisting of a first region and second region entirely delineated by a straight line parallel to a short side of the card, the first region entirely containing the cut-out zone and its area being smaller than the area of the second region, a first slit in the metal layer connecting the cut-out zone to a peripheral edge of the first region and a second slit in the metal layer opening either onto a peripheral edge of the metal layer or into the cut-out zone, the second slit ending with a closed portion in the second region,
  said at least one antenna portion being a second antenna comprising at least one turn located facing the first slit and at least one turn located facing the second slit.

BRIEF DESCRIPTION OF THE DRAWINGS

Other features and advantages of the present invention will become apparent from the description given below, with reference to the appended drawings, which illustrate examples of embodiment thereof that are completely non-limiting in nature. In the figures.

DESCRIPTION OF EMBODIMENTS

Figure 1:
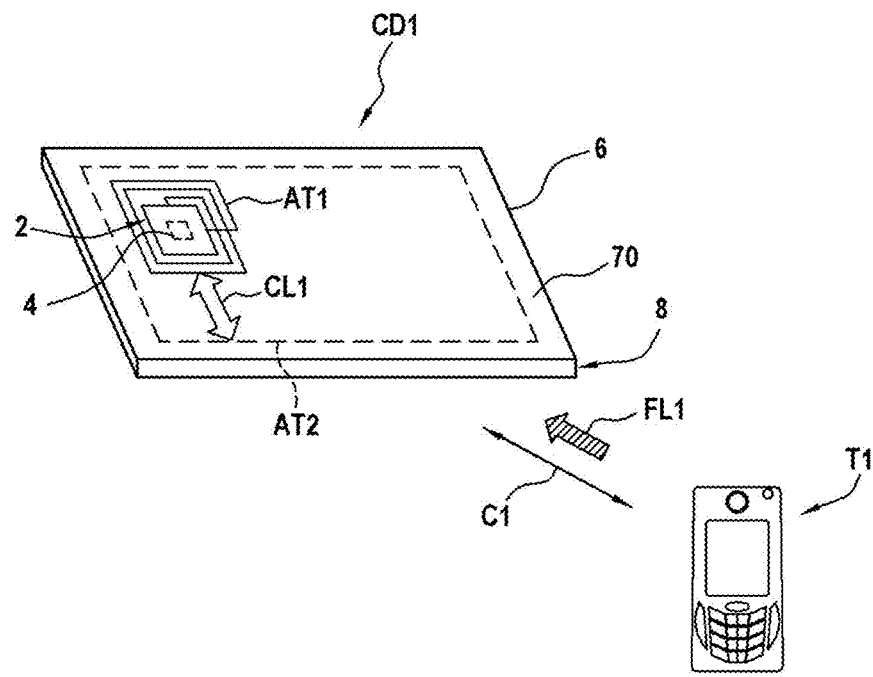
FIG. 1 schematically shows a chip card interacting with a terminal, according to at least one embodiment of a first variant of the invention.

The present application claims the priority of French patent applications No. FR2113850 filed on 17 Dec. 2021 and FR2214390 filed on 23 Dec. 2022, which are incorporated herein by reference.

As indicated above, the invention relates to metal chip cards configured to operate in contactless mode, and also relates to the manufacture of such chip cards. In the present document, a "metal chip card" is a chip card comprising a metal or a combination (alloy) of metals, for example taking the form of a metal layer or of a plurality of metal layers.

As indicated above, a contactless chip card is configured by nature to communicate contactlessly with the outside world, and more particularly with an external NFC reader. To this end, a contactless chip card incorporates a radio-frequency (RF) antenna for exchanging (receiving and/or transmitting) RF signals with an external NFC reader. Such a chip card may further have the capacity to also operate in contact mode, using external contacts provided for this purpose on the surface of the card: "dual" cards (or cards with a dual communication interface) are then referred to, these cards thus being capable of operating in contactless mode and in contact mode.

At the present time there is strong demand from users for metal chip cards, in particular for the reasons mentioned above (aesthetic aspects, impression of quality, prestige, etc.). In particular, it is desirable to produce chip cards in which the bulk (or a substantial part) of the card body is made of metal, or at least in which the card body comprises a metal plate (or metal layer), in order to obtain a certain uniformity and quality in the visual and aesthetic appearance of the card.

However, when a contactless chip card comprises a metal layer and an RF antenna placed on or in the vicinity of one of the faces of the metal layer, it has been observed that this metal layer disrupts contactless communication between the RF antenna and the outside world, in particular when the metal layer is placed between the RF antenna and the external NFC reader with which the chip card is attempting to communicate, because of the electromagnetic shielding induced by the metal layer. Thus, depending on the position and orientation of the card with respect to the reader, it may or may not be possible to perform a contactless transaction between a metal chip card and an external NFC reader. In certain cases, a transaction is possible if the chip card is presented so that the antenna is placed on the side of the NFC reader (without the metal layer being interposed between the two), but RF communication is disrupted, or even impossible, if the metal layer forms an electromagnetic barrier between the RF antenna of the card and the NFC reader (the metal plate acts as an electromagnetic barrier between the RF chip and the NFC reader). However, for RF communications to be possible between a metal chip card and an external NFC reader, it is generally necessary for the card to comprise ferrite in order to limit the electromagnetic disruption caused by the metal portion. Without ferrite, even if a metal chip card is correctly oriented relative to an external NFC reader, it is generally not possible to properly exchange RF communications between the card and the NFC reader, thus making any transaction impossible (or at least difficult).

The invention in particular intends to overcome the aforementioned drawbacks and problems. To this end, the invention relates to a chip card comprising a card body formed at least partly by a metal layer comprising a cut-out zone, the metal layer being at least partially covered by a coating that is more conductive than the metal layer, an RF chip, a first RF antenna placed in or facing the cut-out zone and electrically connected to the RF chip, at least one RF antenna portion electrically insulated from the metal layer and from the first RF antenna and configured to collect an image current induced by first eddy currents flowing at least over the coating of the metal layer and to allow coupling to the first antenna.

The invention also relates to a process for manufacturing such chip cards. Particular embodiments, and other aspects of the invention, are described in more detail below.

In the present description, examples of implementation of the invention are described with reference to a "dual" chip card, i.e. a card with a dual communication interface, having the capacity to communicate both in contact mode (via external contacts) and in contactless mode (via an RF antenna structure). It will however be noted that the invention is more generally applicable to any chip card configured to communicate contactlessly, irrespectively of whether it has the ability to also operate in contact mode.

In addition, in the following examples the considered chip card is a bank card, such as a payment card for example. This chip card may comply with the standard ISO 7816 and may operate according to the EMV standard, although neither of these aspects is essential to implementation of the invention. More generally, the invention applies to any metal chip card configured to implement a transaction in contactless mode, including EMV cards or chip cards using another transaction standard, for example the NFC standard (for example according to ISO 14443-2, ISO 10373-6 or "EMV Contactless Certification"). Generally, the chip card of the invention may be configured to carry out a transaction of any type, such as banking transactions (payments, transfers, debits, etc.), authentication-related transactions, etc.

Unless otherwise indicated, elements common to a plurality of figures or analogous elements in a plurality of figures have been designated with the same reference signs and have identical or analogous characteristics, and hence these common or analogous elements have generally not been described more than once for the sake of simplicity.

The terms "first", "second", etc. have been used in this document by arbitrary convention to allow various elements (such as keys, devices, etc.) implemented in the embodiments described below to be identified and distinguished.

Particular embodiments of a chip card CD1 according to a first variant of the invention will now be described with reference to FIGS. 1-6.

As shown in FIG. 1, according to certain particular embodiments, the metal chip card CD1 is configured to communicate in contactless mode with the outside world, and for example with an external terminal (or reader) T1. To this end, the chip card CD1 comprises an RF chip 4, a card body 6 and two RF antennas (or at least two RF antennas), namely a first RF antenna ANT1 and a second RF antenna ANT2. The RF chip 4 and the two RF antennas ANT1 and ANT2 are positioned on or in the card body 6.

The card body 6 is formed at least in part of (or comprises) a metal layer 8. This metal layer 8 may be made of a single metal, such as stainless steel or aluminium for example, or of an alloy of a plurality of different metals. The metal layer 8 may comprise a plurality of metal sublayers. According to one particular example, the card body 6, and more generally the chip card CD1, is devoid of ferrite, this allowing manufacture of the card to be simplified.

The metal layer 8 is covered at least partially by a coating 70 that is more conductive than the layer 8, and that for example is made of copper, silver or gold.

In the examples considered here, the card body 6 is in ID-1 credit-card format, although the invention may be implemented with other formats.

The RF chip 4 is an electronic chip configured to set up contactless communication C1 with the external terminal T1 using the RF antennas ANT1 and ANT2, as described below. To do this, the RF chip 4 is electronically connected to the first RF antenna ANT1 but the second RF antenna ANT2 is electrically insulated from the RF chip 4 and from the first RF antenna ANT1. The antennas ANT1 and ANT2 partly face each other in order to allow magnetic coupling between these two antennas and thus allow the RF chip 4 to use the second RF antenna ANT2 to set up a contactless communication C1 with the external terminal T1, as described in more detail below.

Various implementations of the chip card CD1, and in particular of the metal layer 8, of the coating 70 and of the RF antennas ANT1 and ANT2, are possible, as shown in FIGS. 2-8.

Figure 2:
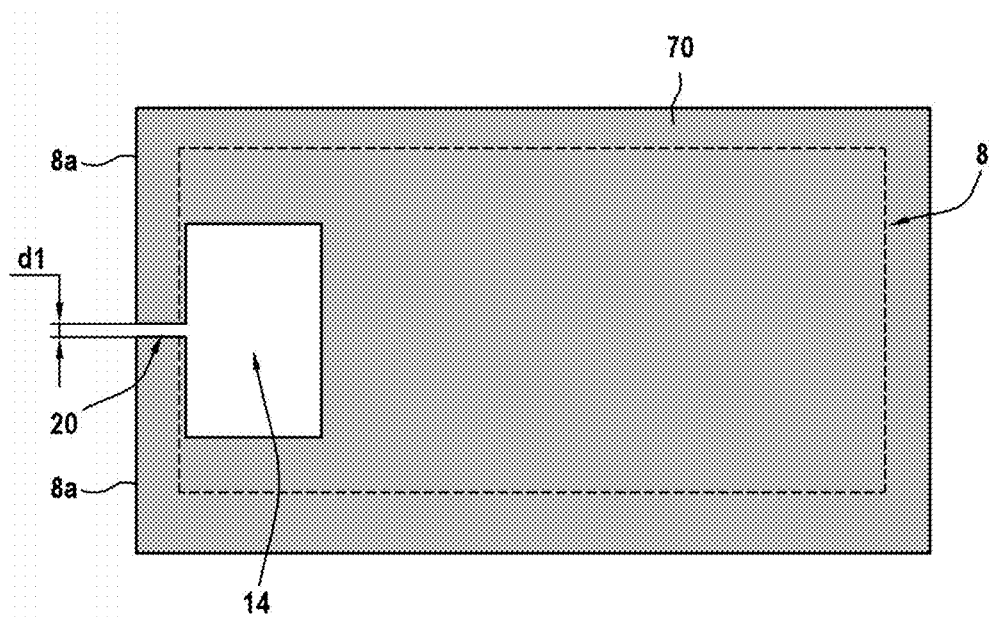
FIG. 2 is a top (or bottom) view of a metal layer forming one portion of a chip card according to at least one particular embodiment of this first variant.
Figure 3:
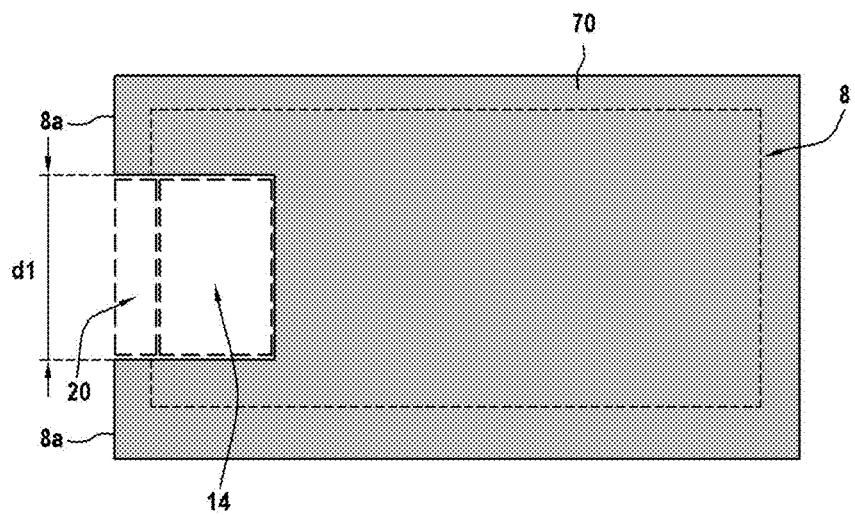
FIG. 3 is a top (or bottom) view of a metal layer forming one portion of a chip card according to at least one particular embodiment of this first variant.

By way of illustration, FIGS. 2 and 3 show only the metal layer 8 according to two different embodiments. In these two examples, the metal layer 8 is entirely covered by the coating 70 and comprises a cut-out zone 14 that opens onto a peripheral edge (or outline) 8a of the metal layer 8. The cut-out zone 14 is a through-aperture (or zone) formed in the metal layer 8 to allow the first RF antenna ANT1 to be positioned facing a portion of the second RF antenna ANT2 as described below. The shape and dimensions of this cut-out zone 14 may be set on a case-by-case basis. By way of example, the cut-out zone 14 formed in the metal layer 8 is rectangular.

More precisely, in the example shown in FIG. 2, the metal layer 8 comprises a linking aperture (or zone) 20 that connects or links the peripheral edge 8a with the cut-out zone 14.

This linking aperture 20 itself forms a peripheral cut-out zone that may for example take the form of a slit. In other words, the cut-out zone 14 emerges (or opens) onto the peripheral edge 8a via this linking aperture 20. This linking zone 20 is characterized by a distance d1 separating two opposite peripheral edges of the metal layer 8, the value of this distance d1 potentially varying from case to case.

Thus, in the example shown in FIG. 3, the distance d1 of the linking zone 20 separating two opposite peripheral edges of the metal layer 8 is identical to the height (or length) of the cut-out zone 14 itself. The linking zone 20 thus forms, in the metal layer 8, a second cut-out zone that lies in the extension of the first cut-out zone 14. The cut-out zone 14 thus forms, with the linking zone 20, a notch in the metal layer 8. In other words, the cut-out zone 14 extends, in this example, to the peripheral edge 8a of the metal layer 8 (without formation of a slit or the like being required).

The position of the cut-out zone 14 in the metal layer 8 may vary from case to case. According to the particular examples shown in FIGS. 2-3, the cut-out zone 14 is positioned in the vicinity of a peripheral edge 8a of the metal layer 8, this making it possible to ensure effective magnetic coupling FL1 between the RF antennas ANT1 and ANT2, as explained in more detail below. Other implementations are however possible, in which for example the cut-out zone 14 is positioned at the centre (or substantially at the centre) of the metal layer 8, it being understood that this cut-out zone 14 is always configured to open onto (or be linked to) a peripheral edge 8a of the metal layer 8 via a linking zone 20.

The advantage of forming such a cut-out zone 14 in the metal layer 8 will become more clearly apparent from the following description. Particular embodiments in which the metal layer 8 comprises a cut-out zone 14 with the configuration illustrated in FIG. 2 will now be considered with reference to FIGS. 4A-7.

Figure 4A:
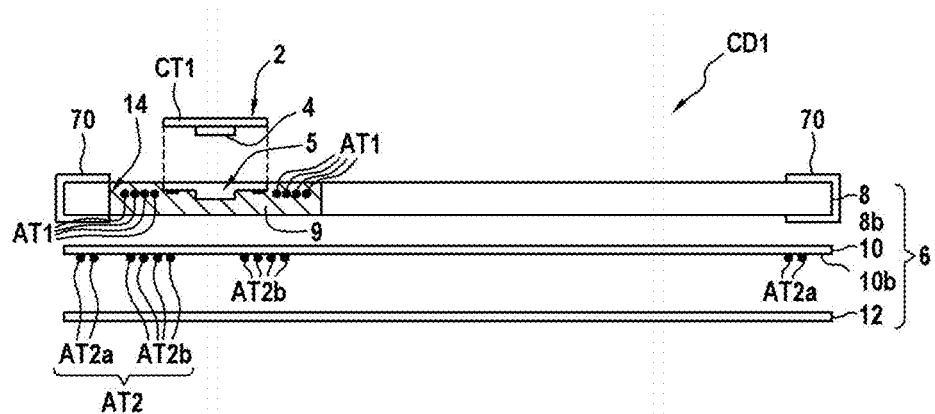
FIG. 4A is an exploded cross-sectional view schematically showing the structure of a chip card according to at least one embodiment of this first variant.
Figure 4B:
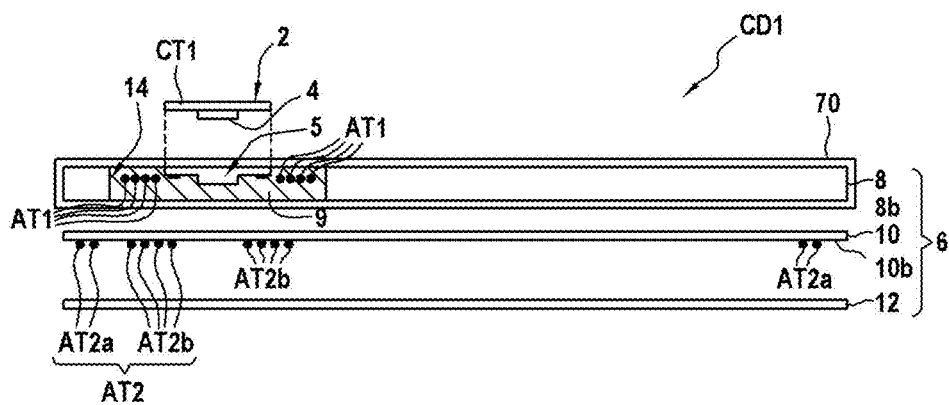
FIG. 4B is an exploded cross-sectional view schematically showing the structure of a chip card according to at least one embodiment of this first variant.

In particular, FIGS. 4A and 4B schematically show an exploded cross-sectional view of the chip card CD1 according to two embodiments, in which the coating is solely found in a peripheral zone of the metal layer or covers its entire surface, respectively.

Figure 5:
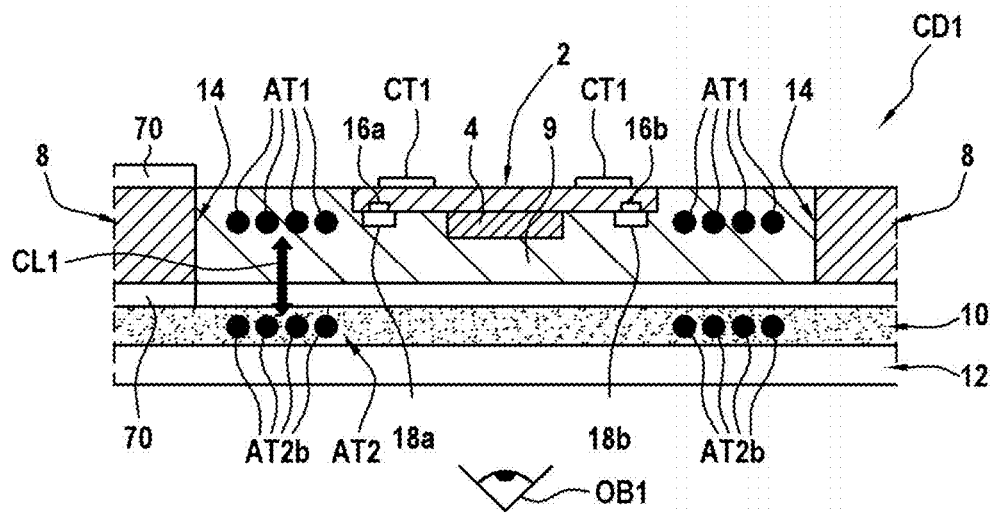
FIG. 5 is a detailed cross-sectional view of a chip card, and more particularly of a segment of the card comprising a cut-out zone, according to at least one particular embodiment of this first variant.

FIG. 5 schematically shows a detailed cross-sectional view of the chip card CD1, according to at least one particular embodiment.

Figure 6:
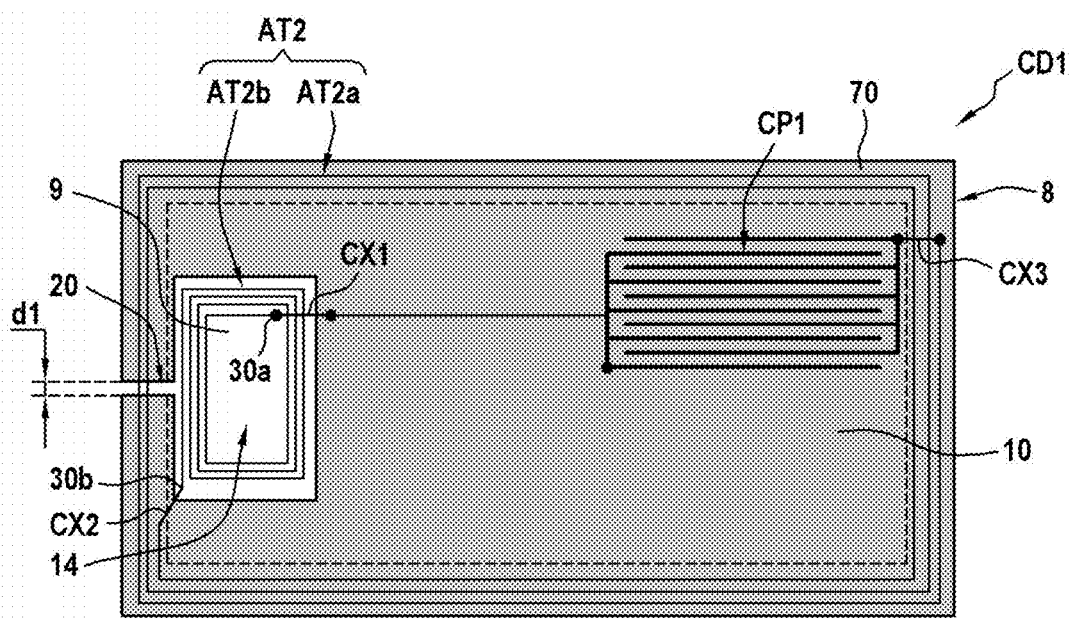
FIG. 6 is a bottom view schematically showing a chip card according to at least one particular embodiment of this first variant.
Figure 7:
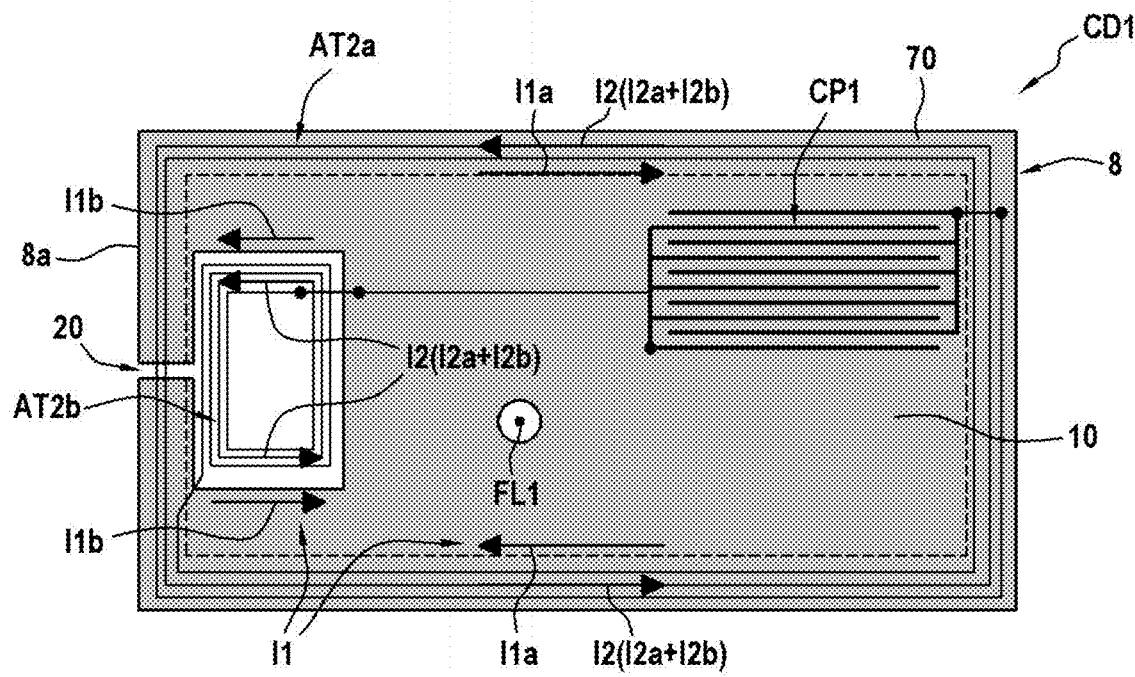
FIG. 7 is a bottom view schematically showing operation of a chip card according to at least one particular embodiment of this first variant.

FIGS. 6 and 7 are bottom views schematically showing the lower face of the chip card CD1, i.e. the face seen from the viewpoint of an observer OB1 shown in FIG. 5, so as to in particular allow the second antenna ANT2 to be seen. To facilitate comprehension of the figures, neither the first RF antenna ANT1 nor the electronic module 2 have been shown in FIGS. 6-7.

FIG. 7 more particularly illustrates the chip card CD1 in operation, as described below.

As shown in FIGS. 4A-7, the RF chip 4 is considered to be comprised (or embedded) in an electronic module 2, the latter being inserted into the card body 6. The electronic module 2 is for example positioned in a cavity 5 formed in the upper face of the card body 6. To do this, the cut-out zone 14 contains an electrically insulating material 9 in which the cavity 5 used to accommodate the electronic module 2 is formed. Thus, the RF chip 4 is positioned in the cut-out zone 14 (or, as a variant, facing and above the cut-out zone 14). It should be noted, however, that various arrangements of the RF chip 4 are possible. Variants in which the RF chip 4 is not placed in, or facing, the cut-out zone 14 are in particular possible.

According to one variant, the RF chip 4 (with or without the electronic module 2) is positioned on (or facing) the metal layer 8. To this end, an insulating material may be placed between the RF chip 4 and the metal layer to provide electrical insulation.

In the example shown in FIGS. 4A-7, the electronic module 2 comprises, on its upper face, external contacts (or contact lands) CT1 configured to allow communication by contact between the RF chip 4 and an external terminal provided to this end (the terminal T1 for example). More particularly, the electronic module 2 may comprise a printed circuit board (PCB) comprising the external contacts CT1 on its upper face, and the RF chip 4 on its lower face. The external contacts CR1 are metal zones designed to welcome connection pins of an external terminal. These external contacts CT1 may be compliant with the standard ISO 7816, although other examples are possible. The electronic module 2 is placed in the chip card CD1 so that its external contacts CT1 are accessible from the upper surface of the card body 6, to allow the RF chip 4 to communicate by contact with an external terminal.

As already indicated, embodiments are also possible without such external contacts CT1. In addition, it is not obligatory for the RF chip 4 to be integrated into the electronic module 2 as shown in the figures, other arrangements of the RF chip 4 without such a module being possible.

As already indicated with reference to FIG. 1, the chip card CD1 comprises two RF antennas, denoted ANT1 and ANT2, which are positioned in or on the card body 8. Each of the RF antennas ANT1, ANT2 comprises at least one electrically conductive turn so as to allow exchanges of RF signals between the chip card CD1 and the outside world.

The RF antennas ANT1 and ANT2 may each consist, for example, of an electrically conductive track, wire or member forming one or more conductive turns. In the present case, the first and second RF antennas ANT1, ANT2 are considered to each comprise a plurality of conductive turns. Various manufacturing techniques (deposition, etching, wire winding) well known per se may be used to produce these RF antennas. The physical characteristics (shape/size of the intersection, length of the antenna, number of turns, material, etc.) of the RF antennas ANT1 and ANT2 may be set on a case-by-case basis in particular to allow wireless communication at the desired frequencies (or in the desired frequency ranges).

More precisely, as shown in FIGS. 4A-7, the first RF antenna ANT1 comprises a plurality of electrically conductive turns-called "first" conductive turns-placed in the cut-out zone 14. In this particular case, the size of the RF antenna ANT1 is therefore limited insofar as its first conductive turns are contained in the cut-out zone. As a variant, the first RF antenna ANT1 may be placed, not in the cut-out zone 14 itself, but facing (above) this cut-out zone 14.

Moreover, the second RF antenna ANT2 is electrically insulated from the metal layer 8 and from the first RF antenna ANT1.

This insulation may be achieved in various ways. For example, if the second antenna ANT2 is produced by etching, an insulating layer (solder mask) may be placed between the second antenna ANT2 and the metal layer 8 in order to prevent short-circuiting and oxidation of the second antenna. According to another example, the second antenna ANT2 may consist of a conductive wire surrounded by an insulating plastic sheath.

Furthermore, the second RF antenna ANT2 comprises two antenna portions, namely a first antenna portion AT2a and a second antenna portion AT2b, which are electrically connected to each other. In this particular example, this second RF antenna AT2 is formed in the insulating layer 10 or optionally on the lower face 10b of the insulating layer 10.

More precisely, the first antenna portion AT2a comprises a plurality of electrically conductive turns, called "second" conductive turns, that lie facing (or opposite) a portion of the metal layer 8 covered by the coating 70 so as in particular to collect an image current I2a induced by eddy currents I1—called "first" eddy currents below—flowing at least over this coating, and possibly in its thickness, and possibly through the metal layer 8 if the skin depth of the coating 70 is less than its thickness.

In the embodiment of FIG. 4A, the coating 70 is present only on a peripheral edge of the metal layer 8.

In the embodiment of FIG. 4B, the coating 70 covers the entire metal layer 8.

As described below with reference to FIG. 7, eddy currents are produced under the effect of a magnetic field FL1 to which the chip card is subjected. Such a magnetic field is generated in this example (FIG. 1) by an external terminal T1 with which the chip card CD1 interacts in contactless mode. When the chip card CD1 is exposed to the magnetic field FL1, eddy currents flow in current loops (primary loops and secondary loops) at least over the coating 70 of the metal layer 8. The phenomenon of formation of eddy currents is known to those skilled in the art and will therefore not be described in detail in this document.

Various configurations of the first antenna portion AT2a are able to collect the aforementioned image current I2a. As illustrated in FIGS. 6-7, in this example the first antenna portion AT2a (and more precisely the second conductive turns from which it is formed) is (are) considered to lie facing a peripheral zone of the metal layer 8 (i.e. a zone in the vicinity of the peripheral outline of the metal layer 8). This peripheral zone encircles the cut-out zone 14 formed in the metal layer 8. This configuration aims to allow the first antenna portion AT2a to collect a maximum of energy in the form of the image current I2a induced by the dominant loops of the eddy currents generated on the surface of the coating 70 of the metal layer 8 under the effect of a magnetic field FL1 to which the chip card CD1 is subjected. In other words, by virtue of this particular configuration, the first eddy currents I1 (from which the image current I2 collected in the first antenna portion AT2a is produced) correspond to dominant loops of the eddy currents flowing at least over the coating of the metal layer 8 in response to the magnetic field FL1. However, other configurations of the second conductive turns of the first antenna portion AT2a are envisageable.

Thus, according to one particular example, the first antenna portion AT2a is interlaced with (or encircles, or surrounds) the second portion AT2b and the first RF antenna ANT1. Thus, in the case for example where the chip card CD1 has a conventional bank-card format (ID1 format), the first antenna portion AT2a may be placed along the peripheral outline of the metal layer 8 (preferably as close as possible to the physical edge of the metal layer 8), this peripheral outline being covered by the coating 70, while having this interlaced spatial configuration. The gap between the first antenna portion AT2a and the peripheral edge of the metal layer 8 may be greater than or equal to a minimum gap depending on the antenna technology used (for example, the minimum gap is set to about 500 µm if the first antenna portion AT2a is manufactured using a PCB technique (PCB standing for printed circuit board), or set to about 2 mm, or even about 3 mm, if the first antenna portion AT2a is manufactured using wire technology (wire antenna). The maximum distance between the first antenna portion AT2a and the peripheral edge of the metal layer 8 may also be set on a case-by-case basis, insofar as the first antenna portion AT2a is interlaced with the second portion AT2b and the first RF antenna ANT1.

According to one particular example, the card body 6 is in the ID1 format of a credit card and the first antenna portion AT2a comprises second conductive turns that are also substantially in the ID1 format.

Moreover, the second antenna portion AT2b comprises a plurality of electrically conductive turns, called "third" conductive turns. The second antenna portion AT2b is electrically connected to the first antenna portion AT2a and lies facing the cut-out zone 14 in order to allow coupling CL1 (FIG. 5) by magnetic induction (magnetic coupling) between the first RF antenna ANT1 and the second RF antenna AT2.

Specifically, the metal layer 8 extends over the card body 6 so as to form electromagnetic shielding (or an electromagnetic barrier) between the two faces of the chip card DV1. Thus, the second antenna portion AT2b is electromagnetically isolated by the metal layer 8 from the upper face of the chip card CD1 and from the external environment located in the vicinity of this upper face. With the exception of the first RF antenna ANT1, which may where appropriate be placed in the cut-out zone 14, this cut-out zone 14 is devoid of electrically conductive material, this allowing the second antenna portion AT2b to couple electromagnetically to the first RF antenna ANT1 through said cut-out zone 14 (FIG. 5), without the metal layer 8 being able to get in the way. This also allows energy to be coupled directly from the incident magnetic field of the terminal T1 to the second antenna portion AT2b, this generating a current component I2b such as described below in particular with reference to FIGS. 7-8.

To achieve a high level of magnetic coupling CL1, the second antenna portion AT2b is preferably positioned facing, at least partly, the first RF antenna ANT1. Generally, the second antenna portion AT2b is at the very least aligned with, or located facing, the cut-out zone 14, so that the magnetic coupling CL1 may be achieved. However, an offset may be tolerated between the first turns of the first RF antenna ANT1 and the third turns of the second antenna portion AT2b insofar as the cut-out zone 9 nevertheless allows the magnetic coupling CL1 to be ensured.

Once magnetic coupling CL1 has been achieved between the RF antennas ANT1 and ANT2 under the effect of a magnetic field FL1 to which the chip card CD1 is subjected, the RF chip 4 may then use the second RF antenna ANT2, coupled to the first RF antenna ANT1, to communicate in contactless mode with the outside world, i.e. with the external terminal T1 in this example (FIG. 1). Operation of the chip card CD1 and in particular of its RF antennas is described in greater detail below.

The RF chip 4 may for example comprise a microcontroller (or a processor) configured to set up a contactless communication C1 with the world outside the chip card CD1 (with the external terminal T1 in this example) using the first and second RF antennas ANT1, ANT2 coupled together by magnetic induction.

Generally, the first antenna portion AT2a of the second RF antenna ANT2 occupies a larger area than the second antenna portion AT2b since the latter is positioned facing the cut-out zone 14.

As already indicated, the RF chip 4 is placed in the cut-out zone 14 in the example shown in FIGS. 4A-7. According to one variant, the first RF antenna ANT1 is placed outside the cut-out zone 14, namely facing the cut-out zone 14 (in alignment with and above the latter), so that the cut-out zone 14 is interposed between the first and second RF antennas ANT1 and ANT2 in order to allow coupling CL1 by magnetic induction between said first and second antennas ANT1 and ANT2.

As shown in FIGS. 4A-5, the RF chip 4 is electrically connected to the first RF antenna ANT1. In the example considered here, this electrical connection is made via connection pads (or lands) 16a and 16b with which the electronic module 2 is equipped, these pads being connected to connection pads (or lands) 18a and 18b provided to this end in the cut-out zone 14 (in the insulating material 9 in this example), respectively. The connection pads 18a and 18b are in turn connected to the two ends of the first RF antenna ANT1, respectively. However, other ways of connecting the RF chip 4 to the first RF antenna ANT1 are envisageable.

Various configurations of the second RF antenna ANT2 are possible. According to one preferred embodiment, the second antenna portion AT2b lies exclusively facing the cut-out zone 14. In other words, this second antenna portion AT2b, which is formed from a plurality of conductive third turns, is placed facing the cut-out zone 14 so that it does not lie facing the metal layer 8. In particular, the second antenna portion AT2b is not superposed with (or does not cover) the metal layer 8 on the periphery of the cut-out zone 14, this allowing the flux of the magnetic field to which the second antenna portion AT2b and the first RF antenna ANT1 are subjected to be optimized. Although it is not desirable for a segment of the second antenna portion AT2b to lie facing the metal layer 8, a certain tolerance may be accepted in certain cases.

As shown in FIGS. 1, 4 and 5, the RF chip 4 (and optionally the electronic module 2) may be aligned or centred with respect to the cut-out zone 4. Thus, in the examples in question, the conductive turns of the first RF antenna ANT1 extend in the form of a winding around the RF chip 4 in the cut-out zone 14. This arrangement makes it possible to position the RF chip 4 very close to the first RF antenna ANT1 and thus to limit the complexity of manufacture of the chip card CD1. As already indicated, other implementations in which the RF chip 4 is not positioned in, or even facing, the cut-out zone 14 are however possible.

The RF chip 4, and more generally the electronic module 2, may be arranged in the insulating layer 9 (commonly called the inlay). This configuration makes it easier to mount the RF chip 4 and the first RF antenna ANT1 in the card body 6.

As shown in FIG. 6, the chip card CD1 may further comprise a capacitive component CP1 electrically connected to the second RF antenna ANT2. In the examples in question here, the capacitive component CP1 is placed in the insulating layer 10 or on the lower face 10b of this insulating layer 10. Once the magnetic coupling CL1 has been achieved, the RF antennas ANT1 and ANT2 are connected in parallel with the capacitive component CP1. This capacitive component CP1 thus forms, with the RF antennas ANT1 and ANT2, an RLC circuit allowing the resonant frequency of the second RF antenna ANT2 to be tuned so that it is for example equal to 13.56 MHZ, this allowing a communication C1 in contactless mode of RFID type with an RFID reader T1 (for example according to standard ISO14443/ISO 10373, in particular its current version ISO/IEC 10373-6: 2020 or any of the earlier versions, or any later version).

In the examples shown in FIGS. 6-7, the capacitive component CP1 is of comb type and comprises two opposite sets of conductive fingers interdigitated with one another, other forms of capacitor however being possible (parallel-plate capacitor, discrete surface-mounted capacitor, parallel-wire capacitor, etc.). It will be noted that the "interdigitated" capacitor CP1 (with interdigitated conductive fingers placed face to face) is shown schematically in FIGS. 6-7 (and in FIG. 8, which is described below) and is not necessarily the most suitable implementation of the capacitor CP1 in the chip card CD1. For example, it could be preferable for the capacitor CP1 to take the form of a parallel plate capacitor with one plate on either side of the insulating layer 10 or of a discrete SMD capacitor (SMD standing for Surface Mounted Device).

As shown in FIGS. 6-7, by way of example, a first end 30a of the second antenna portion AT2b is considered to be connected via a first connection CX1 to the capacitive component CP1 and a second end 30b of the second antenna portion AT2b is considered to be connected via a second connection CX2 to a first end of the first antenna portion AT2a. Moreover, the capacitive component CP1 is connected via a third connection CX3 to a second end of the first antenna portion AT2a.

The RF chip 4 is thus configured to communicate in contactless mode using the second RF antenna ANT2 when the latter is magnetically coupled to the first RF antenna ANT1. Furthermore, the RF chip 4 may where appropriate communicate in contact mode with the outside world via external contacts CT1, although variants without such external contacts are possible.

As shown in FIGS. 4-7, the card body 6 may further comprise at least one external insulating layer 12 formed on the lower face 10b of the insulating layer 10 so as to cover and protect the second RF antenna ANT2. The first and second antenna portions AT2a and AT2b are thus interposed between the internal insulating layer 10 and the external insulating layer 12 in this particular example. At least one protective insulating layer may also be provided, if necessary, on the upper face of the card body.

Operation of the chip card CD1 such as described above with reference to FIGS. 1-2 and 4-6 will now be described with reference to FIG. 7, according to at least one particular embodiment. The metal layer 8 is still considered to have a configuration such as illustrated in FIG. 2 although variants are possible.

It is assumed that the chip card CD1 is positioned within range of (in the vicinity of) the external terminal T1 so as to be exposed to the magnetic field FL1 emanating from the terminal T1. Under the effect of the magnetic field FL1 to which the chip card CD1 is subjected, eddy currents-generally denoted I1—are generated in the metal layer 8. These eddy currents I1 form loops of flowing current on the surface of the metal layer 8. According to a well-known physical effect, dominant loops and secondary loops of eddy current are thus generated on the surface of the metal layer 8 in reaction to the magnetic field FL1.

As shown in FIG. 7, eddy currents-referred to as first eddy currents-corresponding to dominant loops flowing on the surface of the coating 70 of the metal layer 8 in the vicinity of the peripheral outline of said metal layer 8, have been denoted I1a. Eddy currents-referred to as second eddy currents-corresponding to secondary loops flowing on the surface of the coating 70 of the metal layer 8 in the vicinity of the peripheral outline of the cut-out zone 14, have been denoted I1b. Since the eddy currents flow in closed loops, the eddy currents I1b are actually a continuation of the eddy currents I1a in the vicinity of the peripheral outline of the cut-out zone 14. As may be seen in FIG. 7, the second eddy currents I1b flow, in the vicinity of the second antenna portion AT2b, in a direction of rotation (or direction of flow) opposite to that of the first eddy currents I1a flowing over the coating 70 in the vicinity of the peripheral outline of the metal layer 8. By way of example, in this example the first and second eddy currents I1a, I1b are considered to flow in the clockwise and anti-clockwise directions, respectively, the inverse configuration however being possible depending on the orientation of the magnetic field FL1 in question. The oppositely directed flows of the eddy currents I1a and I1b in particular results from the aforementioned continuation of the eddy currents, and from the presence of the cut-out zone 14 which, in this example, is connected by the linking slit 20 to the peripheral outline 8a of the metal layer 8.

As explained in more detail below, the current I2 flowing through the second RF antenna ANT2 is an induced current resulting from two components, namely: an image current I2a induced by the first eddy currents I1 flowing over the coating 70 of the metal layer 8 in the vicinity of the first antenna portion AT2a; and a current I2b that is induced directly in the second antenna portion AT2b by the incident magnetic field FL1 through the cut-out zone 14 (I2=I2a+I2b). The very structure of the chip card CD1 is designed to lead to this dual contribution of the induced currents I2a and I2b, in order to collect in the second RF antenna the highest possible overall induced current I2.

More precisely, the first antenna portion AT2a lying facing the coating 70 of the metal layer 8 collects an image current I2a induced by the first eddy currents I1a flowing over this coating under the effect of the magnetic field FL1 (FIG. 7). These first eddy currents I1a correspond to dominant loops flowing on the surface of the metal layer 8 in the vicinity of the turns of the first antenna portion AT2a. As already indicated, the first antenna portion AT2a may preferably lie facing a peripheral zone (or strip) of the metal layer 8 covered by the coating 70, to collect a maximum of the energy generated by the dominant eddy-current loops. The first eddy currents I1a flowing in the vicinity of the first antenna portion ANT1a (in this example on the periphery of the metal layer 8) produce an effect that counteracts the incident magnetic field FL1. The induced current I2a collected in the turns of the first antenna portion AT2a is itself a reaction to the first eddy currents I1a.

Thus, the image current I2a induced by the first eddy currents I1a is conveyed by electrical conduction to the second antenna portion AT2b, because of the electrical continuity between the first and second antenna portions AT2a, AT2b, which are connected together. The image current I2a thus flows through the turns of the second antenna portion AT2b, which is positioned facing the cut-out zone 14. As illustrated in FIG. 7, the image current I2a flows in the same direction of rotation (or the same direction of flow) through the turns of the first antenna portion AT2a and those of the second antenna portion AT2b, namely in the anti-clockwise direction in this example. However, because of the presence in the metal layer 8 of the cut-out zone 14 connected via the linking slit 20 to the peripheral edge 8a, the second eddy currents I1b (secondary loops) flow in the vicinity of the cut-out zone 14, on the surface of the metal layer 8, in a direction of rotation (or direction of flow) opposite that of the first eddy currents I2a flowing on the periphery of the metal layer 8. By way of example, the second eddy currents I1b here flow in the anti-clockwise direction whereas the first eddy currents I1a flow in the clockwise direction. Thus, the second eddy currents I1b flowing on the periphery of the cut-out zone 4 contribute to amplifying the image current I1a flowing through the turns of the second antenna portion AT2b.

As already indicated, the second antenna portion AT2b further collects, in its turns, a current I2b that is induced directly by the incident magnetic field FL1 picked up in the cut-out zone 14 by the second antenna portion AT2b. In this example, the magnetic field FL1 is directed from the upper face of the chip card CD1 to its lower face. Thus, the current component I2b induced in the second antenna portion AT2b also flows in the anti-clockwise direction and therefore adds constructively with the image current I2a. Since the two current components I2a and I2b flow in the same direction (in-phase components) in the second antenna ANT2, they add constructively to contribute together to generation of the overall induced current I2 flowing through the second antenna ANT2.

The overall current I2 flowing through the second antenna portion AT2b in turn induces a magnetic field that causes magnetic coupling CL1 between the first RF antenna ANT1 and the second RF antenna portion AT2b, and therefore also between the first RF antenna ANT1 and the second RF antenna ANT2. The combined action of the image current I2a delivered by the first antenna portion AT2a on the one hand, and of the current I2b induced by the magnetic field FL1 in the cut-out zone 14 in the second antenna portion AT2b on the other hand, allows the amount of energy collected in the second RF antenna ANT2 from the magnetic field FL1 to be maximized, and therefore effective magnetic coupling CL1 between the two RF antennas ANT1, ANT2 to be guaranteed, this making it possible to deliver a maximum of energy to the RF chip 4 connected to the first RF antenna ANT1.

In operation, under the effect of the magnetic field FL1 to which the chip card CD1 is subjected, the RF chip 4 is thus capable of using the second RF antenna ANT2 coupled to the first RF antenna ANT1 to communicate with the external terminal T1 (and in particular to transmit RF signals to and/or receive RF signals from the terminal T1). When a user presents the chip card CD1 to the terminal T1, a contactless communication may thus be set up between the terminal T1 and the chip card CD1, whatever the orientation of the latter with respect to the terminal T1. Specifically, the eddy currents I1 (and in particular the first eddy currents I1) are generated in the metal layer 8 whatever the orientation of the chip card CD1 relative to the terminal T1. Likewise, whatever face of the chip card CD1 is presented in front of the terminal T1, the second antenna portion AT2b of the second antenna ANT2 is capable of collecting the current component I2b induced by the magnetic field FL1 in the cut-out zone 14.

Figure 8:
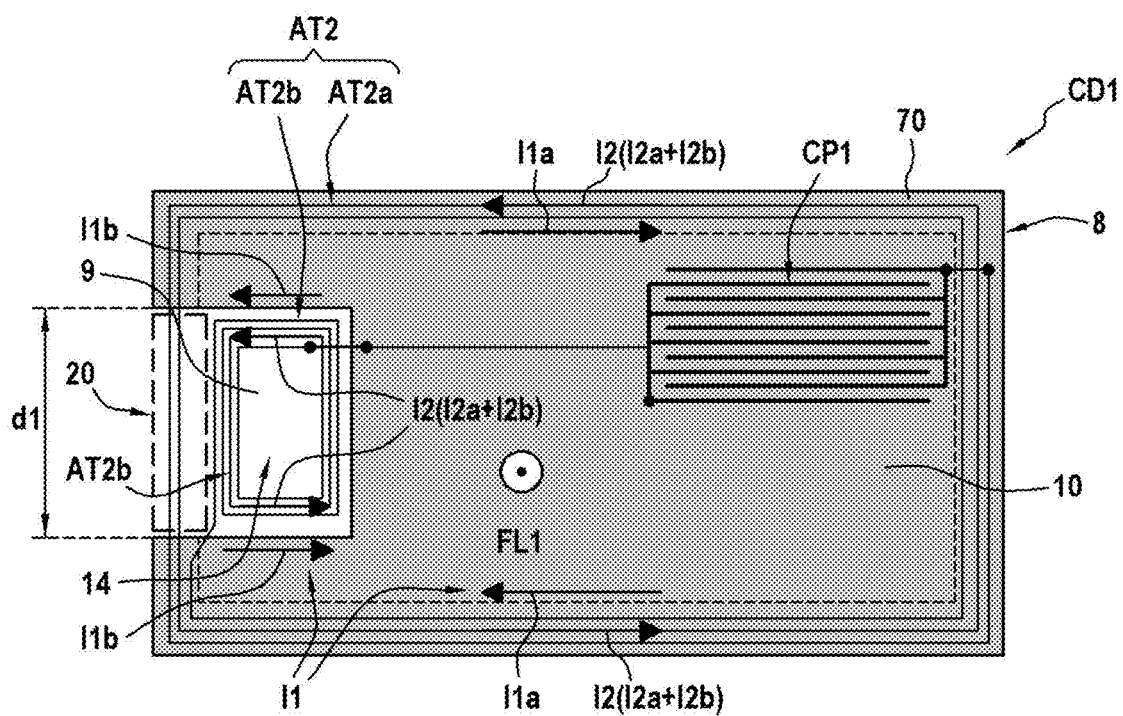
FIG. 8 is a bottom view schematically showing operation of a chip card according to at least one particular embodiment of this first variant.

As already indicated, various arrangements of the chip card CD1 may be envisaged, in particular as regards the configuration in respect of shape, dimensions, position, etc. of the cut-out zone 14 and of the linking aperture 20 connecting the cut-out zone 14 to the peripheral edge 8*a* of the metal layer 8 (FIGS. 2-7). Thus, FIG. 8 is a bottom view schematically showing operation of a chip card CD1 according to at least one particular embodiment, when this card is subjected to a magnetic field FL1 emanating for example from an external terminal T1 (FIG. 1). In the example of FIG. 8, the metal layer 8 is configured as illustrated in FIG. 3, so that the linking zone 20 forms, in the metal layer 8, a second cut-out zone that lies in the extension of the first cut-out zone 14. The cut-out zone 14 thus forms, with the linking zone 20, a notch in the metal layer 8. In other words, the cut-out zone 14 extends, in this example, to the peripheral edge 8*a* of the metal layer 8 (without formation of a slit or the like being required).

The above description relating to the arrangement and operation of the chip card CD1 with reference to FIGS. 1-7 applies analogously to the chip card CD1 of FIG. 8.

Figure 9:
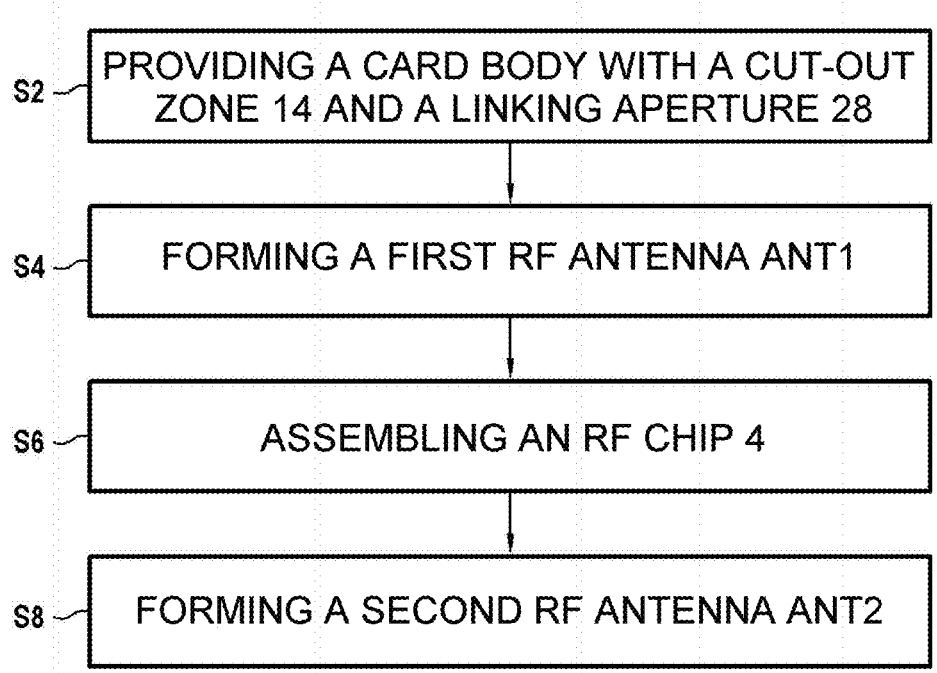
FIG. 9 shows, in the form of a flowchart, the steps of a process for manufacturing a chip card of the invention, according to at least one particular embodiment of this first variant.

FIG. 9 schematically shows a process for manufacturing one of the chip cards CD1 described above, according to at least one particular embodiment. The above description of the chip card CD1 according to various embodiments given with reference to FIGS. 1-8 applies by analogy to the manufacturing process illustrated in FIG. 9.

In a providing step S2, a card body 6 comprising a metal layer 8 such as described above is formed (or provided). In particular, this card body 6 is formed at least partly by a metal layer 8, this metal layer 8 comprising a cut-out zone 14 that opens onto a peripheral edge 8*a* of the metal layer, as already described.

In a forming step S4, a first RF antenna ANT1 is formed on or in (or assembled with) the card body 6 in or facing the cut-out zone 14 of the metal layer 8, as already described.

In an assembling step S6, an RF chip 4 is assembled with the card body 6 in such a way that the RF chip 4 is electrically connected to the first RF antenna, as described above.

In a forming step S8, a second RF antenna ANT2 is formed on or in (or assembled with) the card body 6 so that the second RF antenna ANT2 is electrically insulated from the metal layer 8 and the first RF antenna ANT1, as described above. In particular, the forming step S8 is carried out in such a way that the second RF antenna comprises:

- a first antenna portion AT2*a* lying facing the metal layer with a view to collecting an image current I2*a* induced by first eddy currents I1*a* flowing through the metal layer; and
- a second antenna portion AT2*b*, electrically connected to the first antenna portion AT2*a*, and lying facing the cut-out zone so as to allow coupling FL1 by magnetic induction between the first RF antenna and the second RF antenna.

Figure 10:
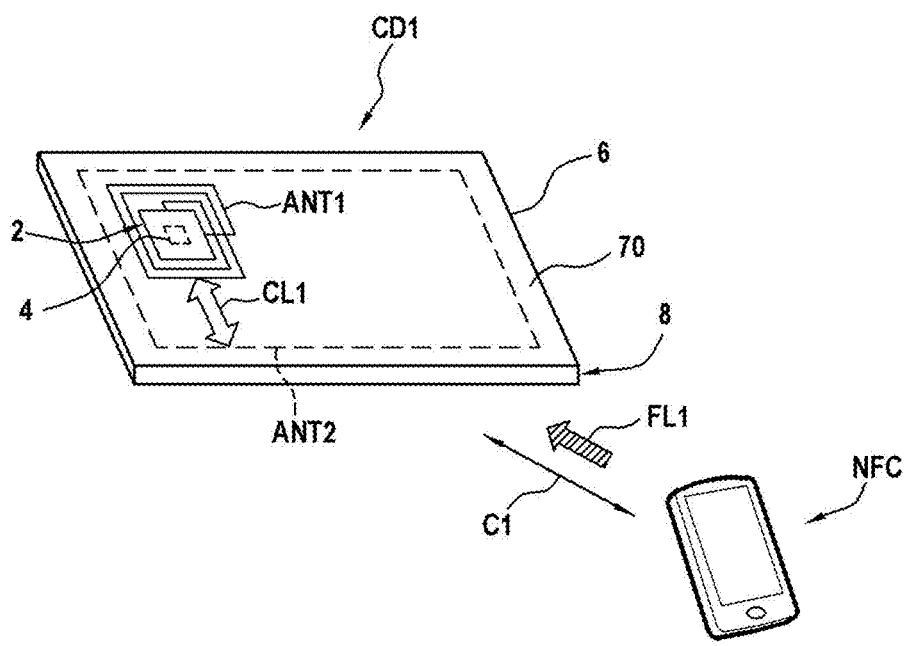
FIG. 10 schematically shows a chip card interacting with an NFC reader, according to at least one particular embodiment of a second variant of the invention.

FIG. 10 shows a chip card CD2 according to a second variant of the invention.

The chip card CD2 is generally rectangular in shape (the corners being slightly rounded).

Figure 11:
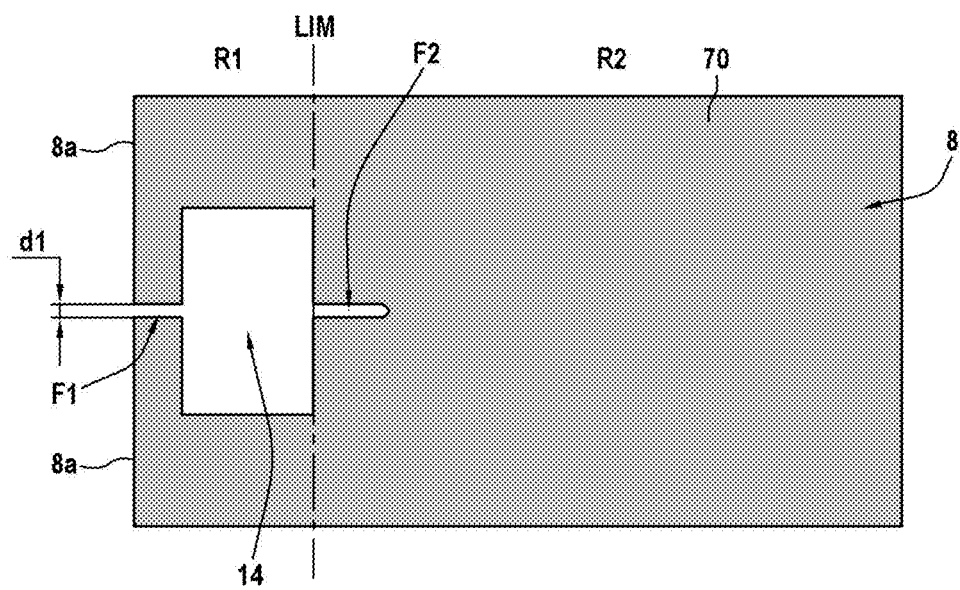
FIG. 11 is a top (or bottom) view of a metal layer of a chip card according to at least one particular embodiment of the invention.

As shown in FIG. 11, in this second variant, the metal layer is considered to consist of two regions R1, R2 delineated by a straight line LIM parallel to a short side of the card, the first region R1 entirely containing the cut-out zone 14 and its area being smaller than the area of the second region R2.

In the embodiment shown in FIG. 11, the straight line LIM is tangent to the cut-out zone 14 on its side closest to the centre of the chip card.

In the example shown in FIG. 11, the metal layer 8 comprises a first slit F1 that connects or links a peripheral edge 8*a* of the first region R1 to the cut-out zone 14.

Particular embodiments in which the metal layer 8 comprises a cut-out zone 14 with the configuration illustrated in FIG. 11 will now be considered.

Figure 12A:
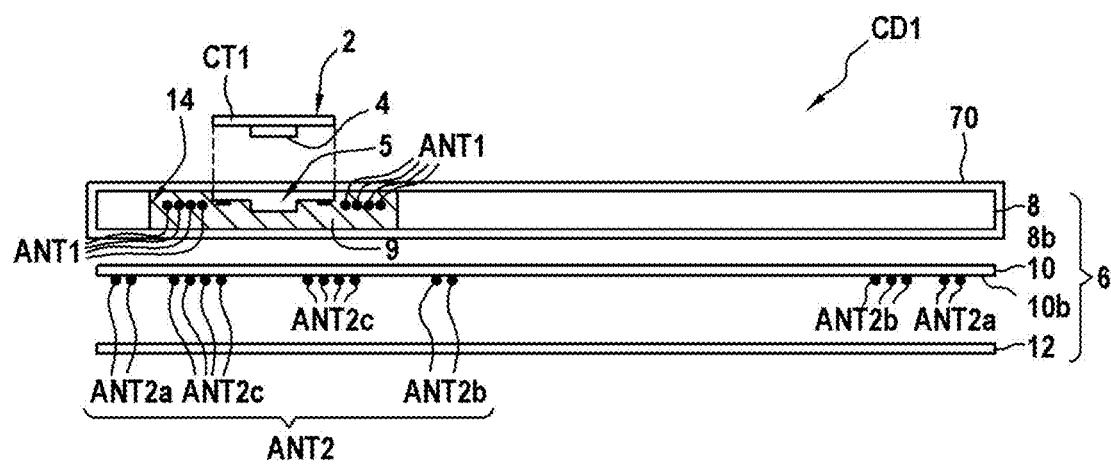
FIG. 12A is an exploded cross-sectional view schematically showing the structure of a chip card according to at least one particular embodiment of the invention.
Figure 12B:
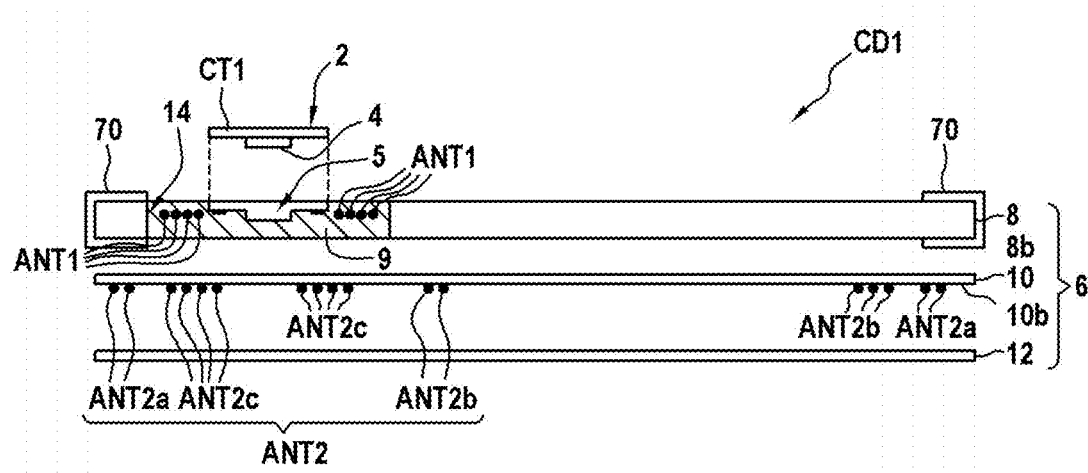
FIG. 12B is an exploded cross-sectional view schematically showing the structure of a chip card according to at least one particular embodiment of the invention.
Figure 13:
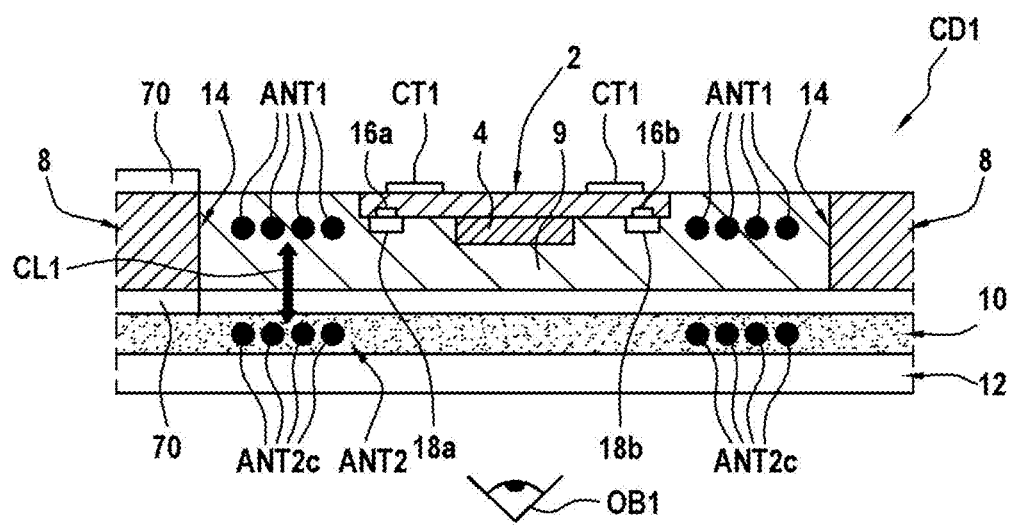
FIG. 13 is a detailed cross-sectional view of a segment of a chip card, according to at least one particular embodiment of the invention.

In particular, FIGS. 12A and 12B schematically show an exploded cross-sectional view of the chip card CD2 and FIG. 13 schematically shows a detailed cross-sectional view of the chip card CD2, according to at least one particular embodiment.

In the embodiment shown in FIGS. 12A, 12B and 13, the card body 6 comprises at least one external insulating layer 12 formed on the lower face 10*b* of the insulating layer 10 so as to cover and protect the second RF antenna ANT2.

Figure 18:
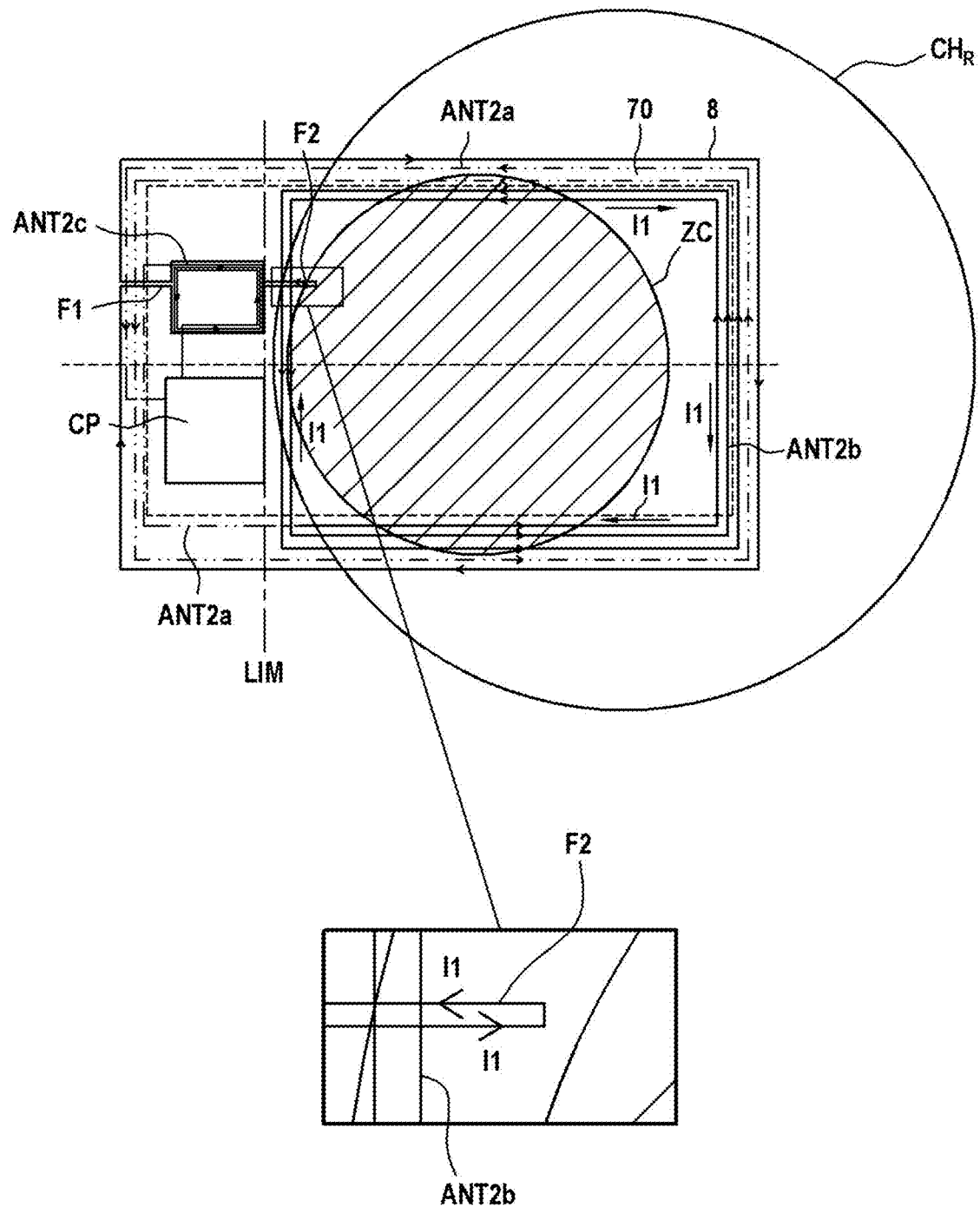
FIG. 18 shows one example of arrangement of an antenna and of a metal layer able to be implemented in a chip card according to one particular embodiment of the invention.

As illustrated in FIG. 18, and to facilitate the description, the second RF antenna ANT2 is considered to comprise at least three antenna portions, namely a first antenna portion ANT2*a*, a second antenna portion ANT2*b*, and a third antenna portion ANT2*c*, that are electrically connected to one another.

More precisely, the first and second antenna portions ANT2*a* and ANT2*b* comprise a plurality of electrically conductive turns, which lie facing (or opposite) the metal layer 8 covered with the coating 70, to collect an image current induced by eddy currents I1 that flow through the metal layer 8 when the latter is subjected to an incident magnetic field.

In the embodiment of FIG. 12A, the coating 70 entirely covers the metal layer 8.

In the embodiment of FIG. 12B, the coating 70 covers only the periphery of the metal layer 8.

More precisely, and as explained in detail below, the first antenna portion ANT2*a* (the second antenna portion ANT2*b*, respectively) is arranged to effectively collect eddy currents flowing over the coating 70 of the metal layer when the chip card CD2 is centred with respect to the antenna of the NFC reader (in an off-centre position with respect to the antenna of the NFC reader, respectively).

In this document, the card is considered to be centred with respect to the antenna of the NFC reader when the entire surface of the card is exposed to a uniform maximum-strength magnetic field generated by the antenna of the NFC reader.

Various configurations of the second RF antenna ANT2 are possible. According to one preferred embodiment, the third antenna portion ANT2*c* lies exclusively facing the cut-out zone 14. In other words, this third antenna portion ANT2*c*, which is formed from a plurality of conductive turns, is placed facing the cut-out zone 14 so that it does not lie facing the metal layer 8. In particular, the third antenna portion ANT2*c* is not superposed with (or does not cover) the metal layer 8 on the periphery of the cut-out zone 14, this allowing the flux of the magnetic field to which the third antenna portion ANT2*b* and the first RF antenna ANT1 are subjected to be optimized. Although it is not desirable for a segment of the third antenna portion ANT2*c* to lie facing the metal layer 8, a certain tolerance may be accepted in certain cases.

Figure 14:
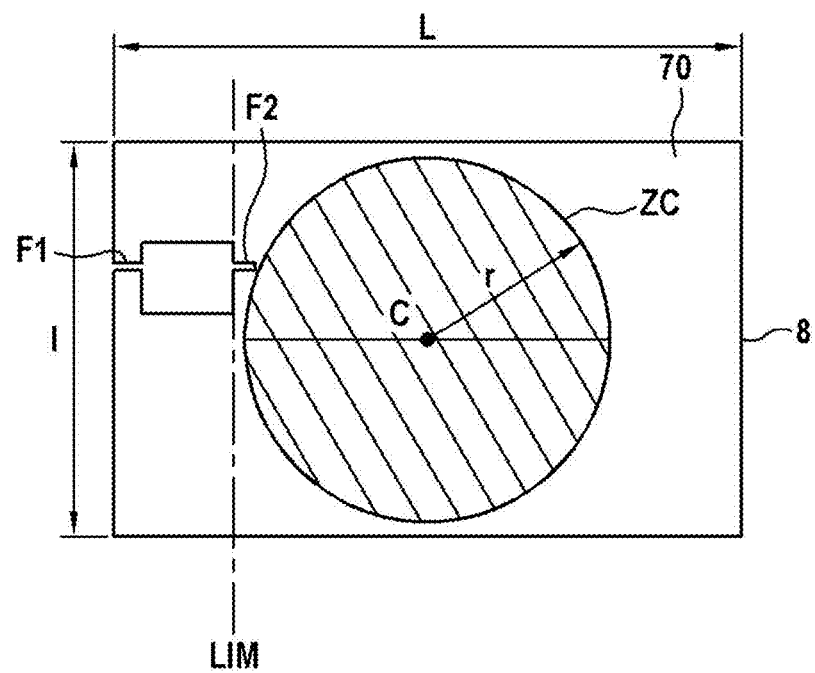
FIG. 14 illustrates a zone of exploitability of eddy currents flowing over a metal layer.

The hatching in FIG. 14 illustrates, for one particular embodiment of the invention, a special zone ZC for exploitation of the eddy currents that flow over the coating 70 of the metal layer 8 when the chip card is exposed to a magnetic field under defined conditions, this special zone ZC entirely covered by the coating 70 being contained in the region R2 of the metal layer 8.

Figure 23:
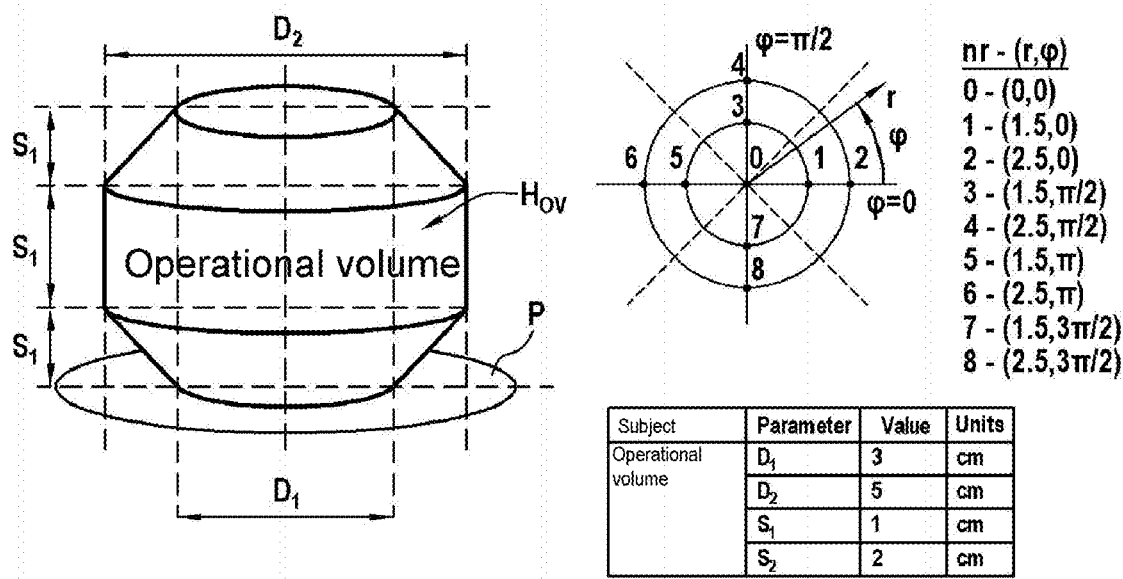
FIG. 23, which has already been described, shows the operating conditions of a chip card as defined by the international organization EMVCo.

FIG. 5 is given, merely by way of illustration, in the particular context of the operating conditions defined by the international organization EMVCo and recalled above with reference to FIG. 23.

Assuming that the reader possesses a circular antenna and that it produces a uniform magnetic field, as soon as the metal surface is no longer entirely opposite a uniform field, the dominant loop no longer follows the outlines of the card, but maximizes the area of this loop in direct view of the maximum-strength magnetic field.

In other words, to a first approximation, the dominant loop bounds the projection of this field on the surface of the card.

In one embodiment of the invention, the special zone ZC for exploitation of eddy currents may be a zone of the surface of the card that is subjected to a uniform maximum-strength magnetic field whatever the operating conditions of the card.

For example, FIG. 14 shows a chip card in ID1 format (length L of 85.6 mm and width I of 54.0 mm, C being the centre of the card and further being considered below to be the centre of the metal layer 8) and a zone ZC of exploitability of eddy currents consisting of a disk having a centre C and a radius r of 2.5 cm.

The inventors have determined that whatever the position of the centre C of the card in the operational volume defined by the organization EMVCo, such a special zone of exploitability ZC (disk of 25 mm radius in the centre of the card) is entirely contained in an electromagnetic field generated by the antenna of the NFC reader of sufficient strength for the eddy currents flowing through this zone to be exploited by the invention.

Figure 15:
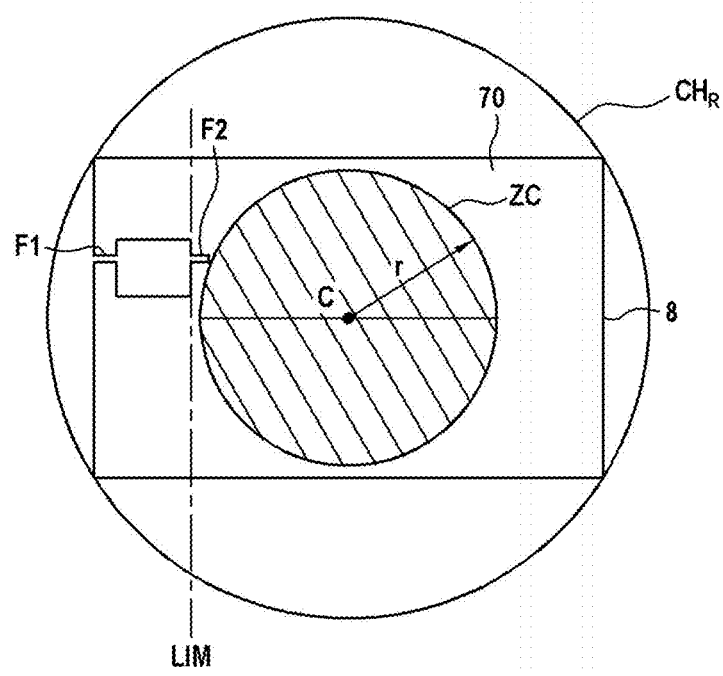
FIG. 15 shows a chip card centred with respect to the source of an incident magnetic field.

In FIG. 15 a circle $CH_R$ bounding a maximum-strength magnetic field generated by an NFC reader has been shown. This figure assumes an NFC-reader antenna that is perfectly circular and rotationally symmetrical.

In this figure, the centre C of the chip card CD2 is located at the centre of the circle $CH_R$.

Figure 16:
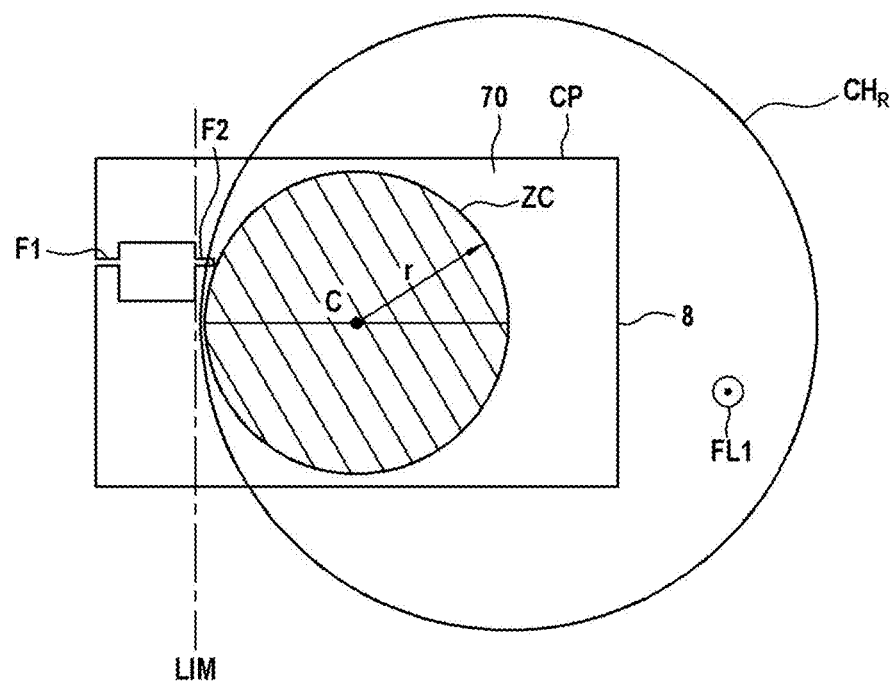
FIG. 16 shows a chip card off-centre with respect to the source of an incident magnetic field.

FIG. 16 shows the chip card CD2, the centre C of the chip card CP being offset by 25 mm with respect to the centre of the circle $CH_R$, this offset of 25 mm corresponding to the maximum offset of the card in the operational volume defined by EMVCo (point 6 of FIG. 23). In the embodiment of FIG. 16, the coating 70 covers the entire metal layer 8.

FIGS. 17A to 17D show, in four examples, a metal layer 8 covered at least in the special zone ZC by the coating 70 and comprising:
(i) a cut-out zone 14 connected by a first slit F1 to the edge 8*a* corresponding to the short side of the metal layer 8 closest to the cut-out zone; and
(ii) a slit F2, noteworthy in that it opens either onto an edge of the metal layer 8 covered by the coating 70, or into the cut-out zone 14 and in that it has a closed end located in the second region R2 of the metal layer covered by the coating 70, and in the examples of FIGS. 17A to 17C more precisely in a special zone ZC of exploitability of eddy currents.

Figure 17A:
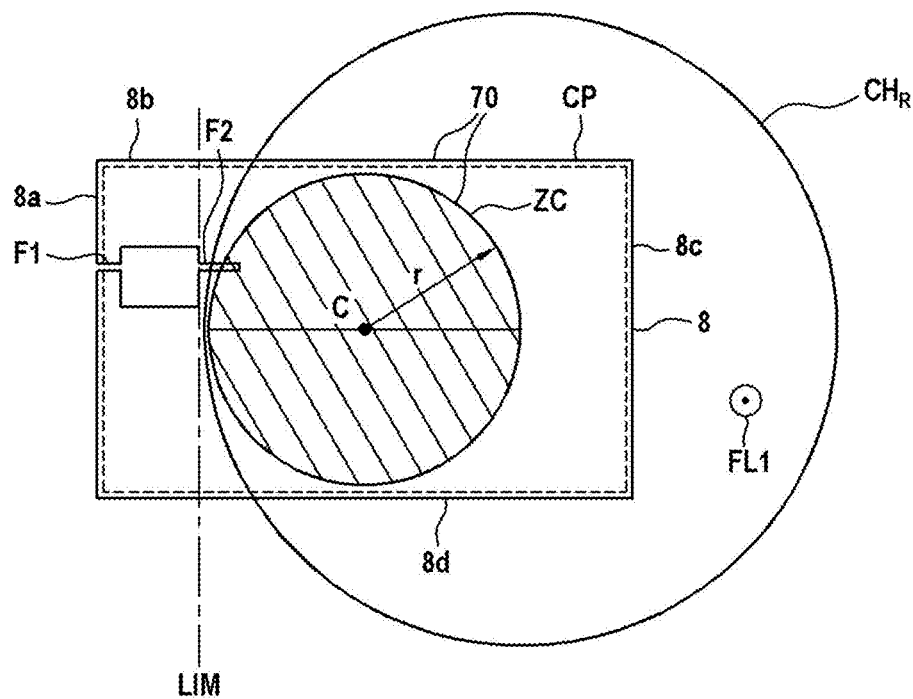
FIG. 17A shows a first example of a metal layer able to be used in particular implementations of the invention.

In FIG. 17A, the metal coating is present only on the periphery of the metal layer 8 and in the special zone ZC.

Figure 17B:
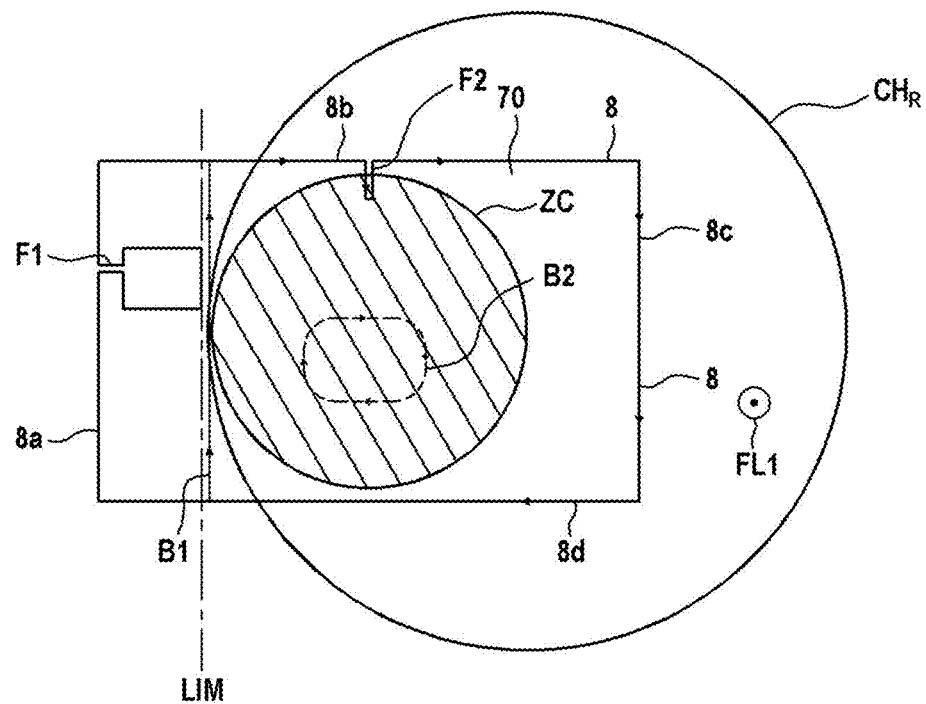
FIG. 17B shows a second example of a metal layer able to be used in particular implementations of the invention.
Figure 17C:
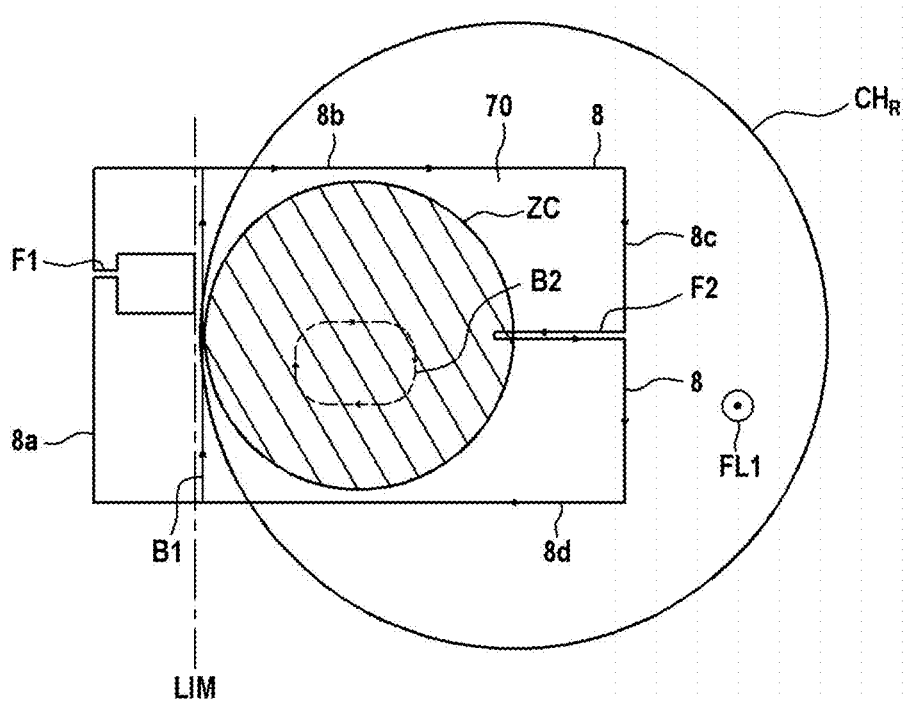
FIG. 17C shows a third example of a metal layer able to be used in particular implementations of the invention.
Figure 17D:
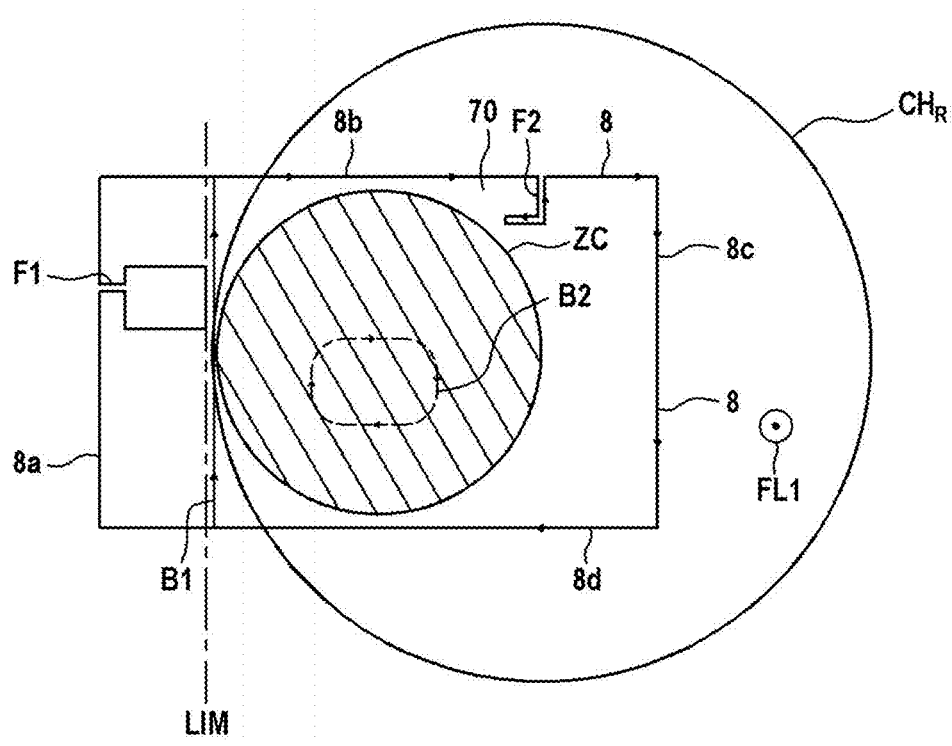
FIG. 17D shows a fourth example of a metal layer able to be used in particular implementations of the invention.

In FIGS. 17B, 17C and 17D, the metal layer 8 is entirely covered by the coating 70.

In FIGS. 17A to 17D, the symbol FL1 shows the direction of the magnetic field of the NFC reader. This magnetic field generates eddy-current loops on the coating 70 of the metal layer 8. For the sake of simplicity, only two loops B1, B2 have been shown, these including a dominant loop B1.

In the four examples, the slits F1 and F2 are thus arranged to let the magnetic field generated by a chip-card reader pass through and to pass an image current of a current flowing in a loop of an eddy current flowing through the metal layer 8.

These slits F2 make it possible to orient the eddy currents so that the latter are in phase with the magnetic flux delivered by the terminal around the slit, and hence the eddy currents around the slit do not counteract this magnetic flux.

FIG. 18 shows, in addition to the metal layer 8, an antenna ANT2 (second antenna in the context of the invention) provided on a plastic layer (not shown).

This figure shows the three portions of this antenna, these portions being referred to below as the first antenna portion ANT2*a*, the second antenna portion ANT2*b* and the third antenna portion ANT2*c*.

The antenna ANT2 is configured so that current flows in the same direction in the first, second and third antenna portions ANT2*a*, ANT2*b*, ANT2*c*.

In the embodiment of FIG. 18, the first antenna portion ANT2*a* is the most peripheral portion. It is arranged facing a portion of the metal layer 8 covered by the coating 70 and extends along the four edges of the metal layer 8. It comprises at least one turn straddling the first slit F1.

In the embodiment of FIG. 18, the second antenna portion ANT2*b* is connected to the first antenna portion ANT2*a*. The second antenna portion ANT2*b* is noteworthy in that it is arranged facing the second region R2 of the metal layer 8, covered by the coating 70, and in that it has at least one turn facing the second slit.

Thus, at least one turn of the antenna ANT2*b* is able to pick up an image current induced by a current flowing in a main loop of an eddy current generated by an incident magnetic field under the operating conditions of the chip card, when this loop is located in the second region R2.

In the embodiment of FIG. 18, the third antenna portion ANT2*c* terminates the second antenna ANT2. It is the portion of the antenna ANT2 that is not superposed with the metal layer 8 but which is superposed with at least one portion of the cut-out zone 14.

Figure 19:
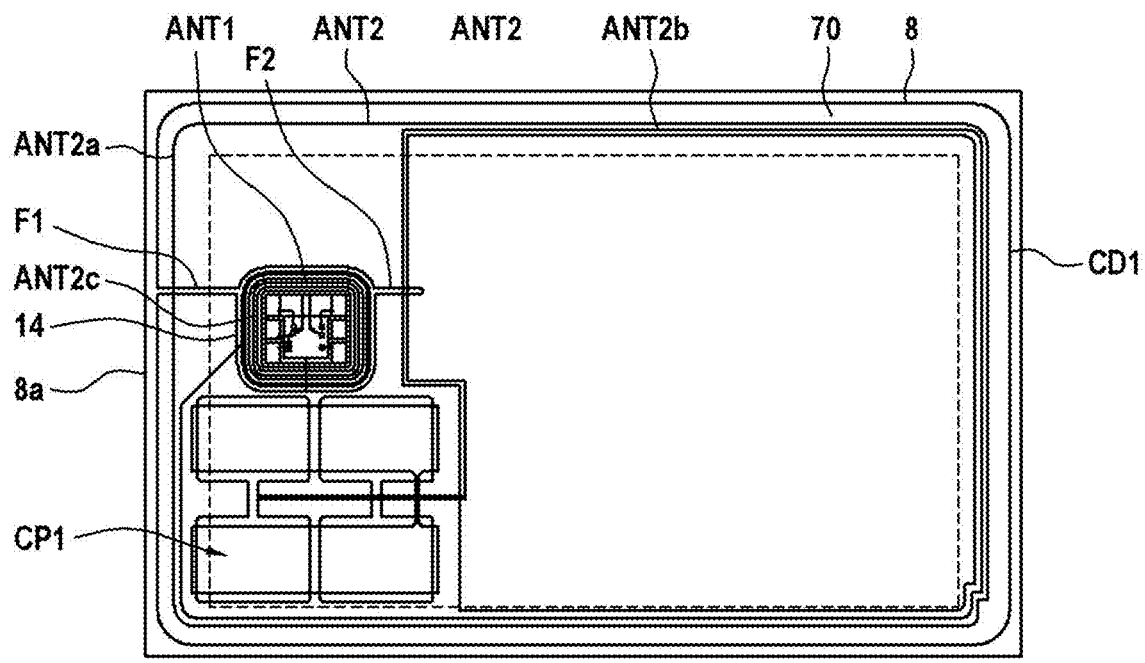
FIG. 19 shows a chip card according to one particular embodiment of the invention.

FIG. 19 shows a chip card CD2 according to one embodiment of the invention. In the embodiment described here, the card CD2 comprises a capacitive element CP1 connected in parallel to the second antenna ANT2.

The examples of slits F2 shown in FIG. 17 are only non-limiting examples. Any slit opening either into the cavity 14 or onto one edge of the card and ending with a closed end in the second region R2, preferably in a special zone ZC of exploitability of eddy currents, may be used in the context of the invention.

Figure 20:
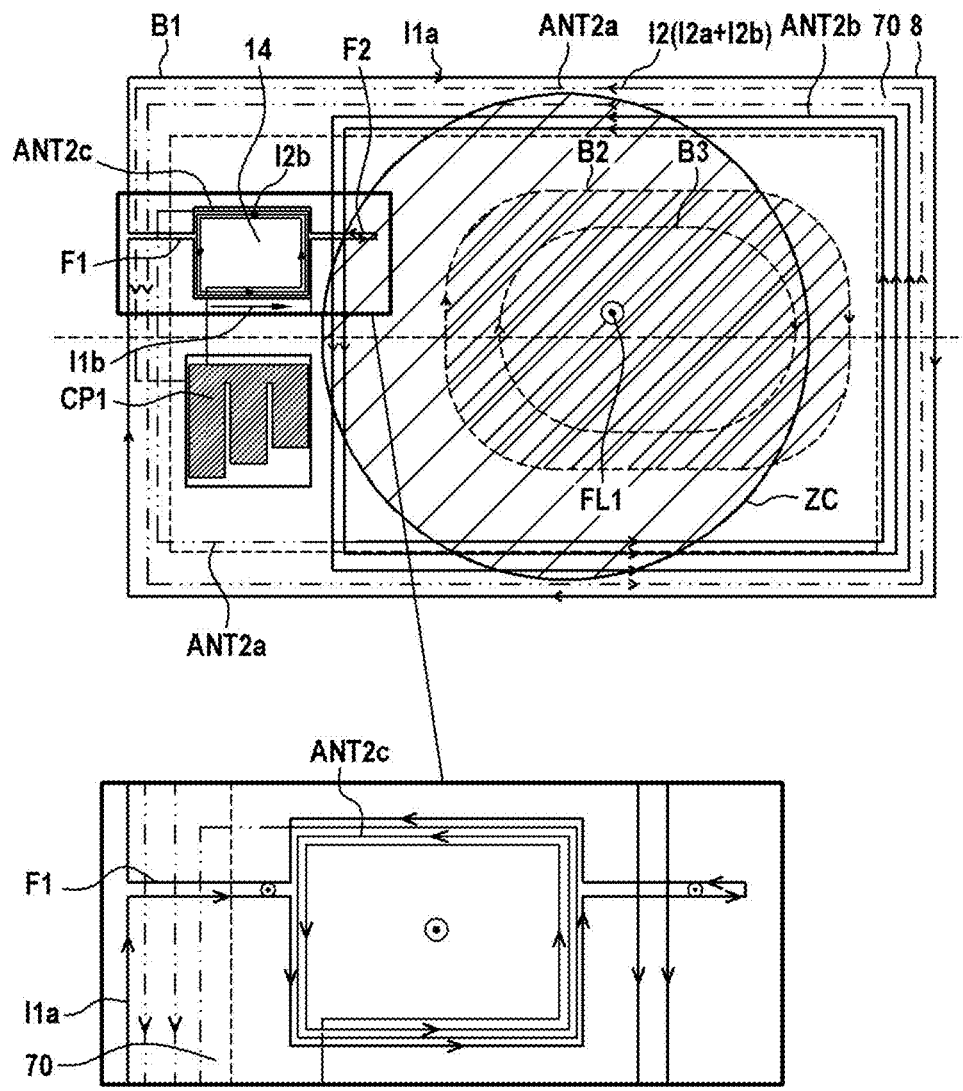
FIG. 20 illustrates operation of the chip card of FIG. 10.

FIG. 20 illustrates operation of the chip card of FIG. 19 when it is centred with respect to the antenna of the NFC reader, or in other words when the surface of the card is exposed to a uniform magnetic field FL1 generated by the reader.

Under the effect of the magnetic field FL1, eddy currents—generally denoted I1—are generated in the coating 70 of the metal layer 8. These eddy currents I1 form closed loops of flowing current on the surface of the metal layer 8. These eddy currents form closed loops in the coating 70 of the metal layer 8, in a direction such as to create a magnetic field that counteracts the incident magnetic field.

In the example of FIG. 20, the eddy currents flow clockwise.

Let it be assumed that the entire surface of the card is exposed to a uniform magnetic field and, as in the case illustrated in FIG. 20, that the dominant eddy-current loop B1 follows the peripheral outline of the metal layer 8 covered by the coating 70. By way of illustration only, two other secondary loops B2 and B3 have been shown.

As known to those skilled in the art, the eddy currents, which flow in the clockwise direction, induce an image current I2a that flows through the first antenna portion ANT2 in the anti-clockwise direction.

As shown in FIG. 20, eddy currents—referred to as first eddy currents—corresponding to dominant loops flowing on the surface of the coating 70 of the metal layer 8 in the vicinity of the peripheral outline of said metal layer 8, have been denoted I1a. Eddy currents—referred to as second eddy currents-corresponding to secondary loops flowing on the surface of the coating 70 of the metal layer 8 in the vicinity of the peripheral outline of the cut-out zone 14, have been denoted I1b.

Since the eddy currents flow in closed loops, the eddy currents I1b are actually a continuation of the eddy currents I1a in the vicinity of the peripheral outline of the cut-out zone 14. As may be seen in FIG. 20, the second eddy currents I1b flow, in the vicinity of the second antenna portion ANT2b, in a direction of rotation (or direction of flow) opposite to that of the first eddy currents I1a flowing in the vicinity of the peripheral outline of the metal layer 8. By way of example, in this example the first and second eddy currents I1a, I1b are considered to flow in the clockwise and anti-clockwise directions, respectively, the inverse configuration however being possible depending on the orientation of the magnetic field FL1 in question. The oppositely directed flows of the eddy currents I1a and I1b in particular results from the aforementioned continuation of the eddy currents, and from the presence of the cut-out zone 14 which, in this example, is connected by the linking slit F1 to the peripheral outline 8a of the metal layer 8.

Therefore, the current I2 flowing through the second RF antenna ANT2 is an induced current resulting from two components, namely: an image current I2a induced by the first eddy currents I1 flowing on the surface of the metal layer 8 in the vicinity of the first antenna portion ANT2a; and a current I2b that is induced directly in the third antenna portion ANT2c by the incident magnetic field FL1 through the cut-out zone 14 (I2=I2a+I2b). The very structure of the chip card CD2 is designed to lead to this dual contribution of the induced currents I2a and I2b, in order to collect in the second RF antenna the highest possible overall induced current I2.

More precisely, the first antenna portion ANT2a lying facing the coating 70 of the metal layer 8 collects an image current I2a induced by the first eddy currents I1a flowing on the surface of the metal layer 8 under the effect of the magnetic field FL1 when the chip card CD2 is centred on the antenna of the NFC reader.

These first eddy currents I1a correspond to dominant loops flowing on the surface of the coating 70 of the metal layer 8 in the vicinity of the turns of the first antenna portion ANT2a. As already indicated, the first antenna portion ANT2a may preferably lie facing a peripheral zone (or strip) of the metal layer 8 covered by the coating 70, to collect a maximum of the energy generated by the dominant eddy-current loops. The first eddy currents I1a flowing in the vicinity of the first antenna portion ANT1a (in this example on the periphery of the metal layer 8) produce an effect that counteracts the incident magnetic field FL1. The induced current I2a collected in the turns of the first antenna portion ANT2a is itself a reaction to the first eddy currents I1a.

Thus, the image current I2a induced by the first eddy currents I1a is conveyed by electrical conduction to the third antenna portion ANT2c, because of the electrical continuity of the first, second and third antenna portions ANT2a, ANT2b, ANT2c, which are connected together.

The image current I2a thus flows through the turns of the third antenna portion ANT2c, which is positioned facing the cut-out zone 14.

As illustrated in FIG. 20, the image current I2a flows in the same direction of rotation (or the same direction of flow) through the turns of the first, second and third antenna portions ANT2a, ANT2b and ANT2c, namely in the anti-clockwise direction in this example. However, because of the presence in the metal layer 8 of the cut-out zone 14 connected via the linking slit F1 to the peripheral edge 8a, the second eddy currents I1b (secondary loops) flow in the vicinity of the cut-out zone 14, on the surface of the metal layer 8 covered by the coating 70, in a direction of rotation (or direction of flow) opposite that of the first eddy currents I2a flowing on the periphery of the metal layer 8. By way of example, the second eddy currents I1b here flow in the anti-clockwise direction whereas the first eddy currents I1a flow in the clockwise direction. Thus, the second eddy currents I1b flowing on the periphery of the cut-out zone 14 do not counteract the magnetic field passing through the slit and contribute to amplifying the image current I1a flowing through the turns of the third antenna portion ANT2c.

Moreover, the effect of the second slit F2 is to push the dominant eddy-current loop towards the second portion ANT2b of the second antenna ANT2, this increasing the coupling of energy between the eddy currents of the coating 70 of the metal layer 8 and the second antenna portion ANT2b in the vicinity of the second slit F2.

As already indicated, the third antenna portion ANT2c further collects, in its turns, a current I2b that is induced directly by the incident magnetic field FL1 picked up in the cut-out zone 14 by the third antenna portion ANT2c. In this example, the magnetic field FL1 is directed from the upper face of the chip card CD2 to its lower face. Thus, the current component I2b induced in the second antenna portion ANT2b also flows in the anti-clockwise direction and therefore adds constructively with the image current I2a. Since the two current components I2a and I2b flow in the same direction (in-phase components) in the second antenna ANT2, they add constructively to contribute together to generation of the overall induced current I2 flowing through the second antenna ANT2.

The overall current I2 flowing through the third antenna portion ANT2c in turn induces a magnetic field that causes magnetic coupling CL1 between the first RF antenna ANT1 and the third RF antenna portion ANT2c, and therefore also between the first RF antenna ANT1 and the second RF antenna ANT2. The combined action of the image current I2a delivered by the first antenna portion ANT2a on the one hand, and of the current I2b induced by the magnetic field FL1 in the cut-out zone 14 in the third antenna portion ANT2c on the other hand, allows the amount of energy collected in the second RF antenna ANT2 from the magnetic field FL1 to be maximized, and therefore effective magnetic coupling CL1 between the two RF antennas ANT1, ANT2 to be guaranteed, this making it possible to deliver a maximum of energy to the RF chip 4 connected to the first RF antenna ANT1.

The third antenna portion ANT2c thus contributes to amplifying the energy harvested because it also comprises an electric-current component induced directly by the incident magnetic field of the NFC reader. The fact that the current flows in the same direction through the three portions of the antenna ANT2 increases the transfer of energy (energy harvested simultaneously from the eddy currents on the surface of the metal layer 8 combined with the harvested energy directly induced by the incident magnetic flux through the cavity zone 14) by coupling to the first antenna ANT1 and therefore to the RF chip 4.

Returning to FIG. 17A for example, when the card CD2 is off-centre with respect to the NFC reader, the dominant loop B1 flows through the second region R2 clockwise in a closed loop along the edges 8*b*, 8*c*, 8*d* of the metal layer 8, this loop traversing the metal layer from the edge 8*d* to the edge 8*b* on a path that maximizes the area of this loop in direct view of the magnetic field of maximum strength.

As explained with reference to FIG. 18, the second antenna portion ANT2*b* is arranged so that at least one of its turns straddles the slit F2 in the second region R2, and preferably in a special zone ZC of exploitability of eddy currents ZC that is covered by the coating 70.

The antenna ANT2*b* is thus able to pick up an image current induced by a current flowing in the dominant loop B1 of the eddy current induced by the magnetic field when the card is off-centre, the dominant loop B1 being diverted by the slit F2, facing at least one turn of the second portion ANT2*b* (and possibly facing or in proximity to at least one turn of the first antenna portion ANT2*a*).

In operation, under the effect of the magnetic field FL1 to which the chip card CD2 is subjected, the RF chip 4 is thus capable of using the second RF antenna ANT2 coupled with the first RF antenna ANT1 to communicate with the external NFC reader (in particular for exchanging RF signals in transmission and/or reception with the NFC reader) whatever the position of the card with respect to the NFC reader under determined operating conditions.

When a user presents the chip card CD2 to the NFC reader, a contactless communication may thus be set up between the NFC reader and the chip card CD2, regardless of the position and orientation of the latter with respect to the NFC reader, the current induced by the dominant loops of the eddy currents being collected either by the first antenna portion ANT2*a* or by the second antenna portion ANT2*b* depending on whether the card is centred or off-centre with respect to the reader, within the limits of the operational conditions of the card.

As already indicated, various arrangements of the chip card CD2 may be envisaged, in particular as regards the configuration in respect of shape, dimensions, position, etc. of the cut-out zone 14 and of the slits F1 and F2.

Figure 21:
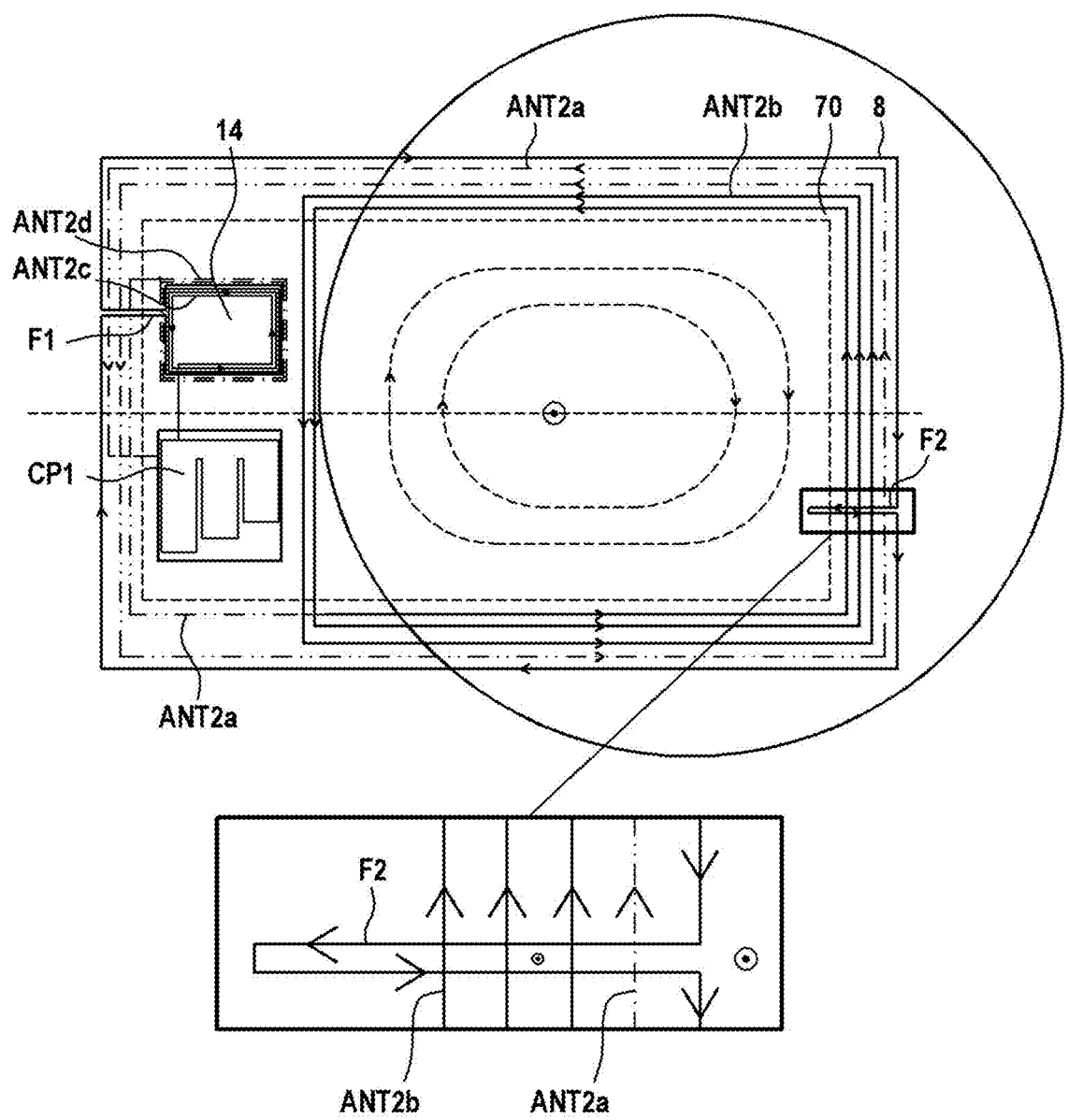
FIG. 21 shows another chip card according to one particular embodiment of the invention.

FIG. 21 illustrates another chip card according to the invention. In this embodiment, the second slit F2 opens onto an edge opposite the edge 8*a* onto which the first slit F1 opens.

In this embodiment of the invention, the second antenna ANT2 comprises a fourth portion ANT2*d* around the cut-out zone 14, which portion connects the turns of the second portion ANT2*b* to the turn of the third portion ANT2*c* of the second antenna ANT2. The fourth antenna portion ANT2*d* is in direct superposition with the conductor of the coating 70 of the metal layer 8 and is also electrically insulated from this metal layer, just like the first and second antenna portions ANT2*a*, ANT2*b*.

These four antenna portions are arranged so that current flows in the same direction through these four portions.

As detailed above, the circle CH$_R$ represents the outline bounding the region/zone of maximum strength of the magnetic field of the NFC reader, in the plane of the card, in which region/zone the field may be considered to be approximately uniform.

FIG. 21 illustrates a situation in which the NFC card is placed offset from the centre of the circle CH$_R$, so that the cut-out zone 14 and the third and fourth antenna portions ANT2*c* and ANT2*d* are outside this region of maximum magnetic field.

The slit F2 opens onto one edge of the card and ends with a closed portion in the second region R2 of the metal layer covered by the coating 70.

This slit F2 is thus arranged to divert the dominant loops of the eddy current towards the zone ZC of exploitation of the eddy currents, facing which zone at least one turn of the second antenna ANT2*b* lies.

In the embodiment described here, the depth of the slit F2 along the longitudinal dimension of the chip card is chosen to be at least equal to or close to the distance of the adjacent turns of the antenna ANT2*b* from the edge of the metal layer onto which the slit F2 opens.

Moreover, and as shown in the detail of FIG. 21, the slit F2 also allows the incident magnetic field of the reader to pass through the metal layer 8 while being in phase with the electric current induced in the turns of the second antenna ANT2*b*. As explained above, the current in the second antenna ANT2*b* has the following components:
  (i) a first component corresponding to the image current picked up by the second antenna ANT2*b*; and
  (ii) a second component created by magnetic induction through the aperture of the slit F2 in the portion of the antenna wires of the second antenna ANT2*b* that straddles the slit F2.

Figure 22:
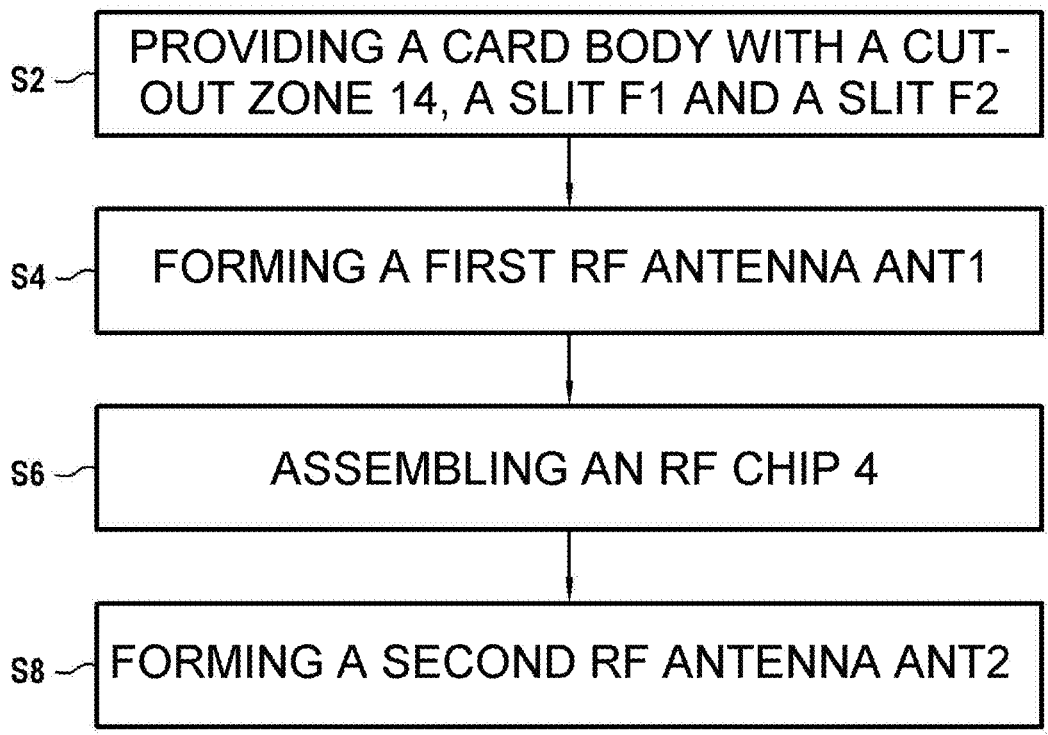
FIG. 22 shows, in the form of a flowchart, the steps of a process for manufacturing a chip card of the invention, according to at least one particular embodiment.

FIG. 22 schematically shows a process for manufacturing one of the chip cards CD2 described above, according to at least one particular embodiment. In a providing step S2, a card body 6 comprising a metal layer 8 such as described above is formed (or provided). In particular, this card body 6 is formed at least partly by a metal layer 8, this metal layer 8 comprising a cut-out zone 14.

In the embodiment described here, the metal layer 8 is entirely covered by the coating 70.

The metal layer 8 is considered to consist of a first region R1 and second region R2 that are entirely delineated by a straight line LIM parallel to a short side of the card CD2, the first region R1 entirely containing the cut-out zone 14, its area being smaller than the area of the second region R2.

The metal layer comprises a first slit F1 that connects the cut-out zone to a peripheral edge 8*a* of the metal layer and a second slit F2 that opens either onto a peripheral edge of the metal layer or into the cut-out zone 14, the second slit F2 ending with a closed portion in the second region R2.

In a forming step S4, a first RF antenna ANT1 is formed on or in (or assembled with) the card body 6 in or facing the cut-out zone 14 of the metal layer 8, as already described.

In an assembling step S6, an RF chip 4 is assembled with the card body 6 in such a way that the RF chip 4 is electrically connected to the first RF antenna, as described above.

In a forming step S8, a second RF antenna ANT2 is formed on or in (or assembled with) the card body 6 so that the second RF antenna ANT2 is electrically insulated from the metal layer 8 and the first RF antenna ANT1, as described above. In particular, the forming step S8 is carried out in such a way that the second RF antenna is intended to allow coupling to the first antenna, the second antenna comprising at least one turn located facing the first slit F1 and at least one turn located facing the second slit F2.

Those skilled in the art will understand that the embodiments and variants described above are merely non-limiting examples of implementations of the invention. In particular, a person skilled in the art will be able to envisage any adaptation or combination of the embodiments and variants described above, in order to meet a particular need according to the claims presented below.

The invention claimed is:

1. A chip card comprising:
a card body formed at least partly by a metal layer having a cut-out zone;
an RF chip;
a first RF antenna that is placed in or facing the cut-out zone and electrically connected to the RF chip;
at least one RF antenna portion that is electrically insulated from the metal layer and from the first RF antenna, said at least one antenna portion being a second RF antenna including:
a first antenna portion lying facing a portion of the metal layer; and
a second antenna portion, electrically connected to the first antenna portion, and lying facing the cut-out zone so as to allow magnetic coupling to the first antenna,
wherein the metal layer is at least partially covered by a coating that is more conductive than the metal layer, and
wherein said first antenna portion lies facing one portion of the metal layer covered by said coating to collect a second current induced by first eddy currents flowing at least over the coating of the metal layer and to allow the second antenna portion to be coupled to the first RF antenna.

2. The chip card according to claim 1, wherein the metal layer is entirely covered by said coating.

3. The chip card according to claim 2, wherein a thickness of the coating is greater than a skin depth of said coating.

4. The chip card according to claim 2, wherein the conductivity of said coating is greater than $3.5 \times 10^7$ S/m.

5. The chip card according to claim 2, wherein said coating is made of copper, silver or gold.

6. The chip card according to claim 2, wherein said cut-out zone opens onto a peripheral edge of the metal layer.

7. The chip card according to claim 1, wherein a thickness of the coating is greater than a skin depth of said coating.

8. The chip card according to claim 7, wherein the conductivity of said coating is greater than $3.5 \times 10^7$ S/m.

9. The chip card according to claim 7, wherein said coating is made of copper, silver or gold.

10. The chip card according to claim 7, wherein said cut-out zone opens onto a peripheral edge of the metal layer.

11. The chip card according to claim 1, wherein the conductivity of said coating is greater than $3.5 \times 10^7$ S/m.

12. The chip card according to claim 11, wherein said coating is made of copper, silver or gold.

13. The chip card according to claim 11, wherein said cut-out zone opens onto a peripheral edge of the metal layer.

14. The chip card according to claim 1, wherein said coating is made of copper, silver or gold.

15. The chip card according to claim 1, wherein said cut-out zone opens onto a peripheral edge of the metal layer.

16. The chip card according to claim 1, wherein the card body is rectangular, said metal layer consisting of a first region and second region that are delineated by a straight line parallel to a short side of the card, the first region containing the cut-out zone,
wherein the chip card includes a first slit connecting the cut-out zone to a peripheral edge of the first region and a second slit opening either onto a peripheral edge of the metal layer or into the cut-out zone, the second slit ending with a closed portion in the second region, and
wherein said at least one antenna portion is a second RF antenna including at least one turn located facing the first slit and at least one turn located facing said second slit.

17. A method for manufacturing a chip card from a card body formed at least partly by a metal layer comprising a cut-out zone, the method comprising:
covering, at least partially, the metal layer with a coating that is more conductive than the metal layer;
forming, on or in the card body, a first RF antenna in or facing the cut-out zone of the metal layer;
assembling an RF chip with the card body so that the RF chip is electrically connected to the first RF antenna; and
forming, on or in the card body, at least one RF antenna portion that is electrically insulated from the metal layer and from the first RF antenna and that is configured to collect a second current induced by first eddy currents flowing at least over the coating of the metal layer and to allow coupling to the first antenna.

18. The method for manufacturing a chip card according to claim 17, wherein said cut-out zone opens onto a peripheral edge of the metal layer, said at least one antenna portion being a second RF antenna including:
a first antenna portion lying facing the metal layer with a view to collecting an image current induced by first eddy currents flowing at least over the coating of the metal layer, and
a second antenna portion, electrically connected to the first antenna portion, and lying facing the cut-out zone to allow magnetic coupling between the first RF antenna and the second RF antenna.

19. The method for manufacturing a chip card according to claim 17,
wherein the body of the card is of generally rectangular shape,
wherein said metal layer consists of a first region and second region entirely delineated by a straight line parallel to a short side of the card, the first region entirely containing the cut-out zone and an area of the cut-out zone being smaller than the area of the second region,
wherein a first slit is included in the metal layer connecting the cut-out zone to a peripheral edge of the first region and a second slit is included in the metal layer opening either onto a peripheral edge of the metal layer or into the cut-out zone, the second slit ending with a closed portion in the second region, and
wherein said at least one antenna portion is a second antenna having at least one turn located facing the first slit and at least one turn located facing the second slit.

20. The method for manufacturing a chip card according to claim 17, wherein the covering the metal layer with the coating that is more conductive than the metal layer further comprises entirely covering the metal layer with the coating that is more conductive than the metal layer.

* * * * *